US012773581B2

(12) United States Patent
Mun et al.

(10) Patent No.: US 12,773,581 B2
(45) **Date of Patent: *Oct. 27, 2026**

(54) MASK APPARATUS

(71) Applicant: LG Electronics Inc., Seoul (KR)

(72) Inventors: Yeongcheol Mun, Seoul (KR); Dongkwon An, Seoul (KR); Sejeong Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 881 days.

This patent is subject to a terminal disclaimer.

(21) Appl. No.: 18/080,154

(22) Filed: Dec. 13, 2022

(65) Prior Publication Data

US 2024/0042250 A1 Feb. 8, 2024

(30) Foreign Application Priority Data

Aug. 2, 2022 (KR) ........................ 10-2022-0096133

(51) Int. Cl.
*A62B 18/02* (2006.01)
*A62B 7/10* (2006.01)
(Continued)

(52) U.S. Cl.
CPC .............. *A62B 18/025* (2013.01); *A62B 7/10* (2013.01); *A62B 9/00* (2013.01); *A62B 18/006* (2013.01);
(Continued)

(58) Field of Classification Search
CPC ........... A62B 18/025; A62B 7/10; A62B 9/00; A62B 18/006; A62B 18/08; A62B 18/084;
(Continued)

(56) References Cited

U.S. PATENT DOCUMENTS 4,687,212 A * 8/1987 Timpson, Jr. ........ F16J 15/3236 277/556
5,372,130 A * 12/1994 Stern .................... A62B 18/006 128/206.17
(Continued)

FOREIGN PATENT DOCUMENTS

CN 208145256 11/2018
CN 111317928 A 6/2020
(Continued)

OTHER PUBLICATIONS

KR101619487_machine_translation_accessed Aug. 19, 2025 (Year: 2025).*
(Continued)

*Primary Examiner* — Victoria Murphy
*Assistant Examiner* — Kris Hanyu Gong
(74) *Attorney, Agent, or Firm* — Fish & Richardson P.C.

(57) ABSTRACT

A mask apparatus according to an implementation of the present disclosure includes a front body; a rear body which is configured to be coupled to the rear surface of the front body and includes: a pair of accommodation portions protruding from a front surface thereof toward the front body; an exhaust port formed under the pair of accommodation portions; and an exhaust flow path guide protruding forward along an edge of the exhaust port; a face guard configured to be coupled to the rear surface of the rear body to be in close contact with the user's face and having a breathing space formed therein; an air cleaning module configured to be placed in the accommodation portion to purify and supply external air and supply the air to the breathing space; and a sealing cover configured to be fitted to an end portion of the exhaust flow path guide.

14 Claims, 26 Drawing Sheets

(51) Int. Cl.
*A62B 9/00* (2006.01)
*A62B 18/00* (2006.01)
*A62B 18/08* (2006.01)
*A62B 23/02* (2006.01)

(52) U.S. Cl.
CPC ............ *A62B 18/08* (2013.01); *A62B 18/084* (2013.01); *A62B 23/02* (2013.01)

(58) Field of Classification Search
CPC ......... A62B 23/02; A62B 18/02; A62B 9/006; A62B 23/025; A61M 2039/244; A61M 16/209; B60J 10/00; B60J 10/20; B60J 10/27
See application file for complete search history.

(56) References Cited

U.S. PATENT DOCUMENTS

| | | | | |
|---|---|---|---|---|
| 10,751,660 | B2 * | 8/2020 | Legare | B01D 46/523 |
| 2015/0289598 | A1 * | 10/2015 | Hsiung | A44B 11/2588 128/202.27 |
| 2017/0157353 | A1 * | 6/2017 | Olsen | A61M 16/0683 |
| 2019/0366029 | A1 * | 12/2019 | Prabhudesai | A61M 16/208 |
| 2020/0008539 | A1 * | 1/2020 | Kolasa | A44B 11/2588 |
| 2020/0206545 | A1 * | 7/2020 | Kim | A62B 18/025 |
| 2020/0206546 | A1 * | 7/2020 | Kim | A62B 23/025 |

FOREIGN PATENT DOCUMENTS

| | | | | | |
|---|---|---|---|---|---|
| EP | 3398657 | | | 11/2018 | |
| KR | 101619487 | B1 | * | 5/2016 | A62B 18/02 |
| KR | 10-2016-0129562 | A | | 11/2016 | |
| KR | 10-2018- 0009326 | | | 1/2018 | |
| KR | 10-2021-0151499 | A | | 12/2021 | |
| KR | 10-2426354 | | | 7/2022 | |
| WO | 2021/167142 | A1 | | 8/2021 | |

OTHER PUBLICATIONS

Office Action in Korean Appln. No. 10-2022-0096133, mailed on Sep. 27, 2023, 14 pages (with English translation).
Extended European Search Report in European Appln. No. 23159965.5, mailed on Jan. 31, 2024, 8 pages.
Office Action in Chinese Appln. No. 202211348685.X, mailed on Jan. 23, 2026, 12 pages (with English translation).

* cited by examiner

MASK APPARATUS

CROSS-REFERENCE TO RELATED APPLICATIONS

The present application claims priority to Korean Patent Application No. 10-2022-0096133, filed on Aug. 2, 2022, the disclosure of which is incorporated herein by reference in its entirety.

TECHNICAL FIELD

The present disclosure relates to a mask apparatus.

BACKGROUND

A mask can be defined as a hygiene product that covers the user's nose and mouth so that harmful substances including germs and dust in the air can be filtered when the user breathes in and also that spreading of a virus or bad breath can be minimized when the user exhales.

In some examples, when a virus that is highly contagious has spread, it can be recommended that individuals wear a mask in order to minimize transmission.

In some examples, masks can include various types and forms. In some examples, in order to minimize harmful substances contained in the air from being introduced into the mask wearer's respiratory tract, masks can include a filter module.

In some examples, in order to facilitate the flow of air passing through the mask when the user breathes in or breathes out, a mask can further include a fan.

In some cases, the mask can include a pressure detection means for detecting the pressure of the breathing space formed between the mask and the user's face, and a fan module whose rotation speed can change according to the pressure detected by the pressure detection means, so that the mask helps the user to breathe comfortably even while wearing the mask.

However, a mask can include a structure in which an air suction port is formed on the front surface of the mask, and an air discharge port is formed on the rear surface of the mask, wherein the rear surface of the mask is close to the user's mouth or nose. Here, the front surface of the mask is a portion exposed to the outside, and the rear surface of the mask is a portion in close contact with the user's face.

In some cases, the air suction port is generally provided at the front surface close to the center of the mask or at the front surface close to both side ends.

As such, in some examples, in a structure in which the air suction port is provided at the front surface of the mask and the air discharge port is provided at the rear surface of the mask, wherein external air is introduced into the mask, passes through the fan and filter, and discharged to the user's respiratory tract through the air discharge port, there can be a problem in that the flow conversion of air occurs excessively.

In some cases, as the number of flow conversions of the suctioned air increases, the flow resistance can increase, and as a result, the load of the fan increases. In addition, as the load of the fan increases, there can be a problem in that the power consumption of the battery supplying power to the fan increases.

In some cases, as the number of flow conversions of the suctioned air increases, there can be a problem in that the flow noise increases.

In some cases, when a user wearing a mask in which the air suction port is disposed at the front surface of the mask often takes off the mask and leaves the air suction port facing upward or forward, there can be a disadvantage in that dust may be introduced through the air suction port.

In some cases, when the air suction port is disposed at the front surface of the mask, it may give an impression that the outer appearance is not good when worn.

In some cases, when the user walks or runs while wearing the mask apparatus, since there is a high possibility that foreign substances can be directly introduced into the suction port, there may be a disadvantage in that the life of the filter can be shortened and the filter replacement cycle can be shortened.

In some cases, a suction port cover can be provided to prevent the air suction port from being exposed to the outside. In some cases, the suction port cover can be separated from the mask or damaged due to an external force or impact.

In some cases, the suction port is not provided at the mask body, but is provided at another portion, for example, the suction port can be provided in a separate air cleaning module that is detachably or foldably coupled to the side of the mask body. However, in some examples, there can be a disadvantage in that the flow resistance significantly may increase while the suctioned air suctioned into the air cleaning module reaches the discharge port provided at the center of the mask body.

SUMMARY

According to one aspect of the subject matter described in this application, a mask apparatus includes a front body, a rear body coupled to a rear surface of the front body, the rear body including a pair of accommodation portions protruding from a front surface thereof toward the front body, an exhaust port provided under the pair of accommodation portions, and an exhaust flow path guide protruding forward along an edge of the exhaust port, a face guard that is coupled to a rear surface of the rear body, the face guard being configured to contact a user's face and defining a breathing space formed therein, an air cleaning module provided at an accommodation portion among the pair of accommodation portions and configured to purify external air and supply the purified air to the breathing space, and a sealing cover coupled to an end portion of the exhaust flow path guide.

Implementations according to this aspect can include one or more of the following features. For example, the sealing cover can include a cover frame provided at a front surface of the exhaust flow path guide, an inner rib extending rearward from an inner edge of the cover frame, and an outer rib extending rearward from an outer edge of the cover frame, wherein a fitting grove is defined between the inner rib and the outer rib and configured to accommodate the exhaust flow path guide.

In some implementations, the sealing cover can further includes a connection rib that couples a left portion and a right portion of the cover frame. In some implementations, the sealing cover can be made of a rubber or silicone material. In some implementations, the sealing cover can extend to an edge of a lower end portion of the rear body.

In some implementations, the pair of accommodation portions can be symmetrically disposed with respect to a vertical plane passing through the center of the rear body in a left and right direction.

In some implementations, the air cleaning module can include a fan module provided at the accommodation portion, a flow guide provided behind the fan module, a filter seated on the flow guide and configured to purify the external air that flows into the fan module, and a filter housing including a filter frame that covers a side surface of the filter and a filter cover that convers a rear surface of the filter.

In some implementations, a suction port can be defined at the filter cover and configured to suction the external air. In some implementations, a discharge port can be defined between an inner edge of the accommodation portion and an inner edge of the flow guide. In some implementations, the suction port can be provided at the rear surface of the rear body and include a plurality of holes having different diameters.

In some implementations, the mask apparatus can further include a pair of strap connectors provided at an upper portion and a lower portion of an end portion of the rear body, respectively. In some implementations, a strap connector of the pair of strap connectors can include a strap groove that is recessed from the front surface of the rear body and extends in a horizontal direction, a strap hole, a strap bar that couples an upper surface and a lower surface of the strap groove, and a tubular waterproof sleeve that is provided at the front surface of the rear body.

In some implementations, a first pair of strap connectors can be provided at a left side portion of the rear body and a second pair of strap connectors can be provided at a right side portion of the rear body.

In some implementations, the tubular waterproof sleeve can extend forward from the front surface of the rear body along an edge of the strap hole by a predetermined length. In some implementations, the tubular waterproof sleeve can be configured to accommodate a sealing cap, the sealing cap configured to limit moisture and foreign substances into a space defined between the front body and the rear body.

DETAILED DESCRIPTION

Hereinafter, a mask apparatus according to implementations of the present disclosure will be described in detail with reference to the drawings.

Figure 1:
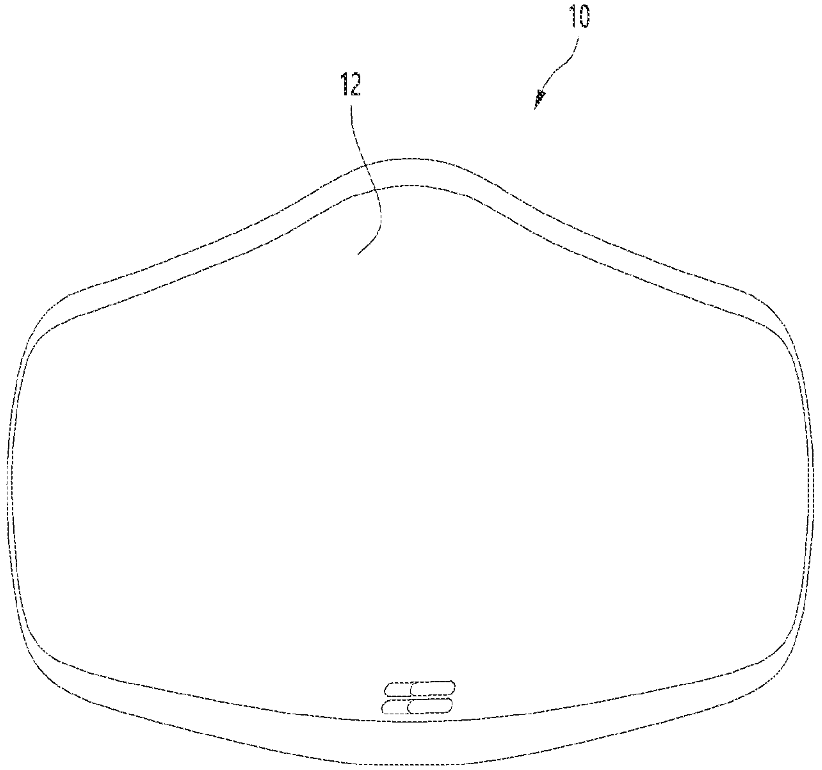
FIG. 1 is a front perspective view illustrating an exemplary mask apparatus.
Figure 2:
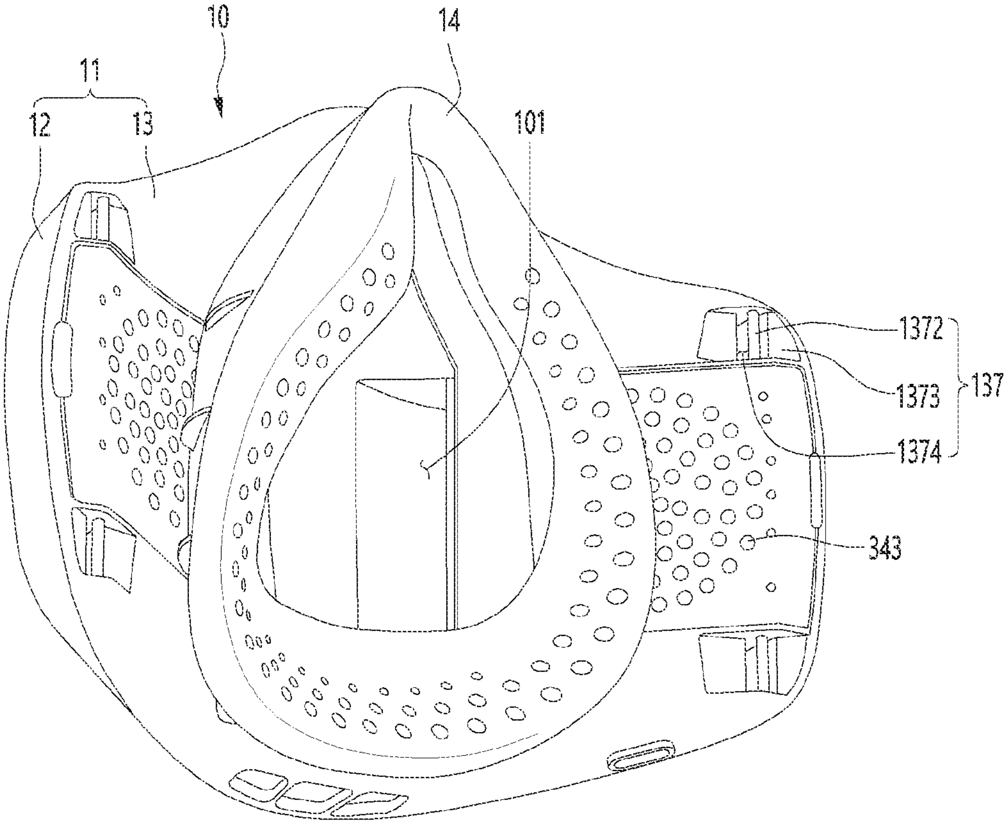
FIG. 2 is a rear perspective view illustrating an exemplary mask apparatus.
Figure 3:
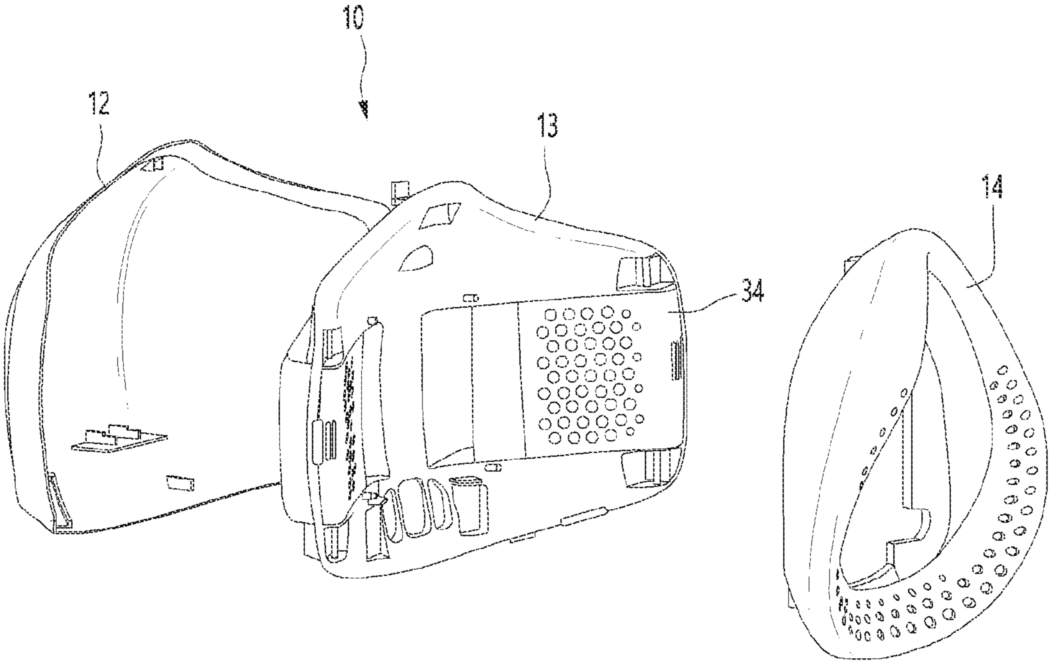
FIG. 3 is an exploded perspective view illustrating an exemplary mask apparatus.
Figure 4:
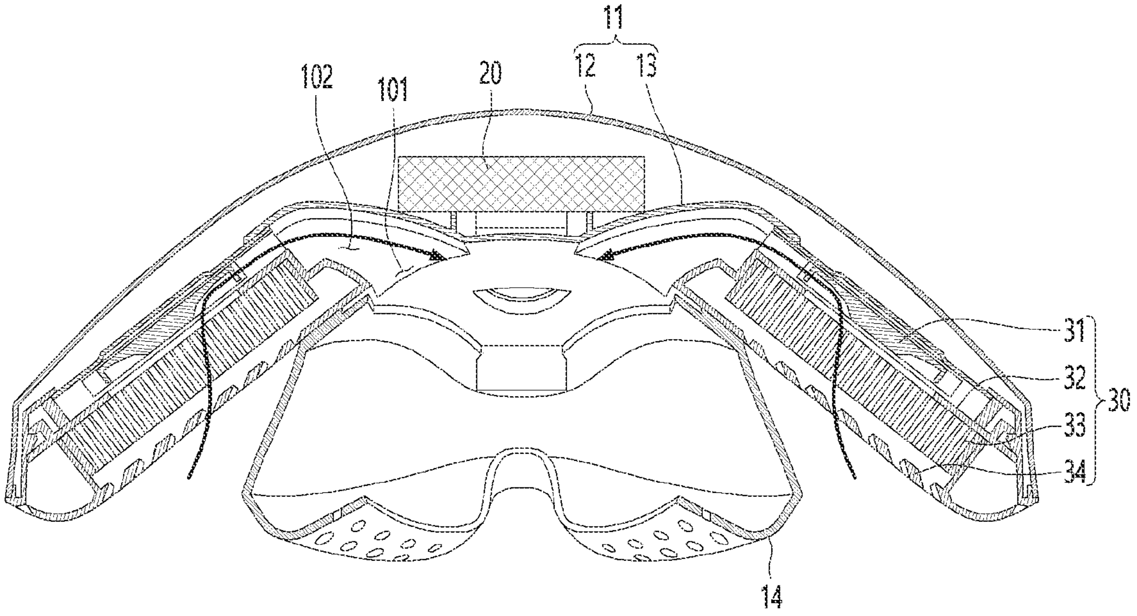
FIG. 4 is a cross-sectional view illustrating an example of air flow inside the mask apparatus.
Figure 5:
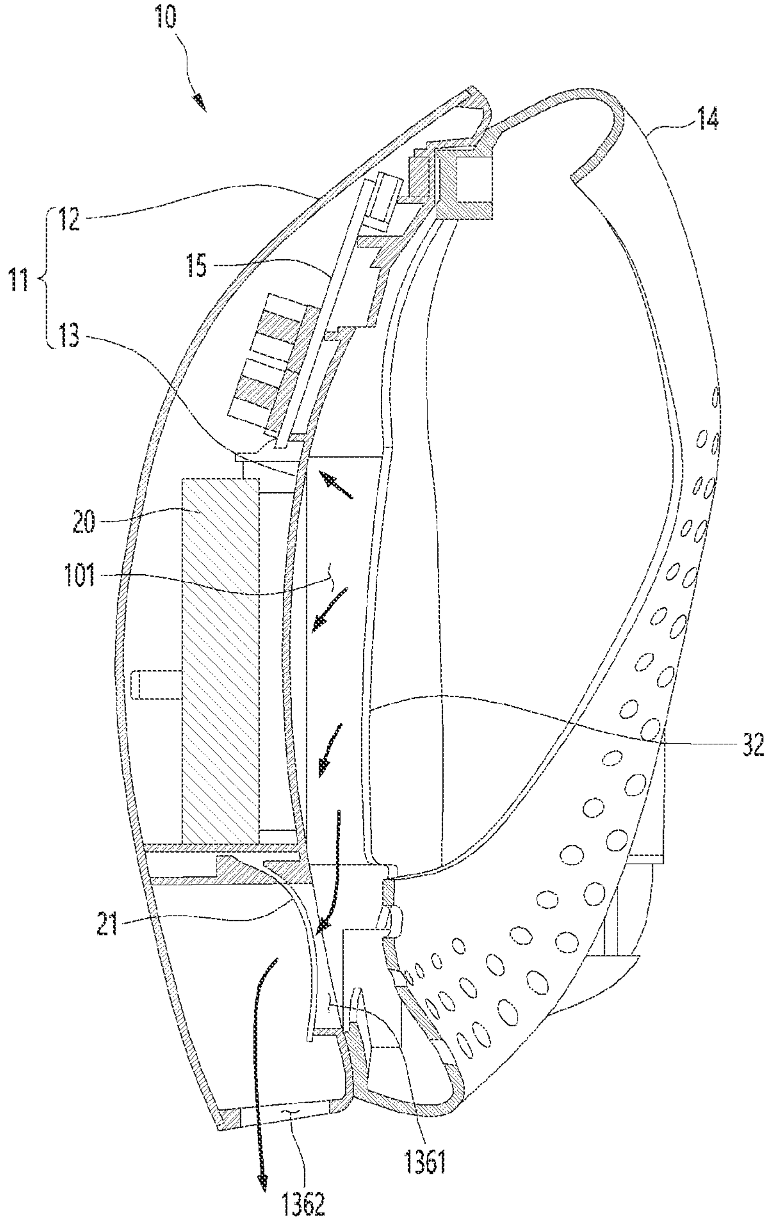
FIG. 5 is a longitudinal cross-sectional view illustrating an example of air flow inside the mask apparatus.

FIG. 1 is a front perspective view of a mask apparatus according to an implementation of the present disclosure, FIG. 2 is a rear perspective view of the mask apparatus, FIG. 3 is an exploded perspective view of the mask apparatus, FIG. 4 is a cross-sectional view of the mask apparatus illustrating the air flow inside the mask apparatus, and FIG. 5 is a longitudinal cross-sectional view of the mask apparatus illustrating the air flow inside the mask apparatus.

Referring to FIGS. 1 to 5, the mask apparatus 10 according to an implementation of the present disclosure includes a mask body 11, a face guard 14 that is fixedly or detachably coupled to a rear surface of the mask body 11, and an air cleaning module 30 provided at the mask body 11.

In some implementations, the mask body 11 includes a front body 12 defining a front external shape and a rear body 13 coupled to a rear surface of the front body 12 and defining a rear external shape. The front surface of the front body 12 defines the front surface of the mask apparatus 10, and the rear surface of the rear body 13 faces the face of the user (or the wearer).

In some implementations, the face guard 14 is coupled to the rear surface of the rear body 13 to be in close contact with the user's face and can be formed of a silicone or rubber material having elasticity. A breathing space is defined inside the face guard 14, and when the user wears the mask apparatus 10, the user's nose and mouth are accommodated in the breathing space. Accordingly, the external air purified while passing through the air cleaning module 30 can be guided to the breathing space and inhaled by the user, and air generated when the user exhales can also be discharged into the breathing space.

In some implementations, a predetermined space is defined between the front body 12 and the rear body 13, and as illustrated in FIGS. 4 and 5, various electrical components can be mounted on the front surface of the rear body 13. In addition, the various electrical components can be shielded by the front body 12 and may not be exposed to the outside.

In some implementations, the air cleaning module 30 can include a fan module 31 provided at an accommodation portion 133 (see FIG. 6) defined in the rear body 13, and a filter 33 provided behind the fan module 31. The fan module 31 can include a centrifugal fan that is configured to suction air in an axial direction and discharge the air in a radial direction.

The air cleaning module 30 can further include a filter housing 34 disposed at the rear of the filter 33, and a suction port 343 defined in the filter housing 34 and configured to suction external air. The filter housing 34 can be rotatably coupled to the rear body 13, and the suction port 343 can include a set of a plurality of holes having different diameters as illustrated.

In some implementations, a discharge port 101 can be defined at a position spaced apart from the suction port 343 in the center direction of the rear body 13. External air suctioned in through the suction port or the suction grill 343 by the operation of the fan module 31 can pass through the filter 33 and the fan module 31 in turn, and then be discharged into the breathing space through the discharge port 101.

The suction port or the suction grill 343 can be disposed outside the face guard 14, and the discharge port 101 can be disposed inside the face guard 14. In some implementations, the suction grill 343 can be provided outside the breathing space, and the discharge port 101 can be provided inside the breathing space, so that external air suctioned in and air exhaled by the user are not mixed with each other.

In some cases, the air cleaning module 30 can further include a flow guide 32 disposed behind the fan module 31.

In some implementations, the mask apparatus 10 can further include at least one of a main control module 15, a power supply module 16, an indicator module 18, a wireless communication module 17, a speaker module 19, a battery 20, and an exhaust valve 21.

In some cases, the main control module 15 can be a module for controlling the operation of the fan module 31 and the speaker module 19 as well as a pressure sensor, a microphone or the like. The main control module 15 can be disposed above the front center of the rear body 13.

The power supply module 16 can be a control module for supplying power to the electric components provided at the mask apparatus 10. The power supply module 16 can be disposed at a lower right side of the front surface of the rear body 13.

In some cases, the power supply module 16 can include a terminal connector into which a terminal of a cable for power supply and data transmission is inserted, an LED module configured to inform the operation state of the mask apparatus 10, and the like. Then, the light irradiated from the LED module can be diffused and guided through the indicator module 18 to be emitted to the outside of the mask apparatus 10.

The wireless communication module 17 can include any one of various types of short-range wireless communication modules including Bluetooth. In some cases, the wireless communication module 17 can be disposed at the lower left of the front surface of the rear body 13. For example, the wireless communication module 17 can be provided at the front surface of the rear body 13 in a direction crossing the rear body 13 horizontally. The wireless communication module 17 can be provided at the front surface of the rear body 13 in a horizontal state by a pair of substrate insertion ribs 1315 protruding from the front surface of the rear body 13. Both side end portions of the wireless communication module 17 can be supported by the pair of substrate insertion ribs 1315.

In some implementations, the speaker module 19 can be disposed at the lower left of the front surface of the rear body 13 corresponding to the lower side of the wireless communication module 17.

In some implementations, the battery 20 can be disposed at a front center of the rear body 13, and the exhaust valve 21 can be configured to shield an exhaust port defined below the front center of the rear body 13. In some cases, the exhaust valve 21 can open the exhaust port when the user exhales, and the exhaust valve 21 can shield the exhaust port when the user breathes in. The exhaust valve 21 may be bent and provided in the form of a flat flap.

Here, it should be noted that the front, rear, left, and right sides of the mask body 11 are defined based on the state where the user wears the mask apparatus 10.

Meanwhile, as illustrated in FIGS. 4 and 5, when the user operates the fan module 31 by pressing the power button, external air can be introduced into the mask apparatus 10 through the suction ports 343 defined on the left and right sides of the rear surface of the mask apparatus 10.

External air introduced through the suction port 343 can be purified while passing through the filter 33. Then, the air passing through the filter 33 can be suctioned in the axial direction of the fan module 31 and then discharged in the radial direction.

In some cases, the air discharged in the radial direction of the fan module 31 can be guided to the discharge port 101 through the air duct 102 defined by the side of the flow guide 32 and the air guide surface 1334 (see FIG. 6) of the accommodation portion 133. In addition, the air can be supplied to the breathing space defined inside the face guard 14 through the discharge port 101.

In some implementations, when the user exhales, the air discharged through the user's mouth and nose can be collected in the breathing space. Then, the air collected in the breathing space can descends and be discharged to the outside through the front surface exhaust port 1361 and the lower surface exhaust port 1362. In some cases, as the exhaust valve 21 is curved forward by the pressure of air generated when the user exhales, the front surface exhaust port 1361 is opened. In addition, when the user breathes in, the pressure inside the breathing space can be lower than atmospheric pressure, and the exhaust valve 21 returns to the original position thereof to shield the front surface exhaust port 1361.

In some implementations, a strap connector 137 can be provided at the left side end portion and the right side end portion of the rear body 13, respectively. In some examples, the strap connector 137 is a portion to which an end portion of a strap or band is coupled, the strap or band configured to be caught on the user's ear or wrap around the back of the user's head. The strap connector 137 can be provided at an upper portion and a lower portion of lower left ends and an upper portion and a lower portion of the right ends of the rear body 13, respectively.

In some cases, both end portions of any one of the pair of straps can be respectively coupled to the strap connectors 137 provided at the upper and lower ends of the left side, and both end portions of the other one of the pair of straps can be coupled to the strap connectors 137 provided at the upper and lower ends of the right side, respectively. Then, the pair of straps can be caught on both ears of the user, respectively.

In some implementations, both end portions of any one of the pair of straps can be respectively connected to the strap connectors 137 provided at the upper end of the left side and the upper end of the right side, and both end portions of the other one of the pair of straps can be coupled to the strap connectors 137 provided at the lower end of the left side and the lower end of the right end, respectively. Then, the pair of straps can be wrapped around the user's back of the head.

Each of the four strap connectors 137 can include a strap groove 1373 that is recessed from the front surface of the rear body 13 and extends in the horizontal direction (the width direction of the rear body), a strap hole 1374 defined at any position of the strap groove 1373, a strap bar 1372 coupling the upper and lower surfaces of the strap groove 1373, and a tubular waterproof sleeve 1371 (see FIG. 6) extending from the rear surface of the rear body 13 corresponding to the edge of the strap hole 1374. In some cases, the hook of the strap can be rotatably coupled to the strap bar 1372.

Figure 6:
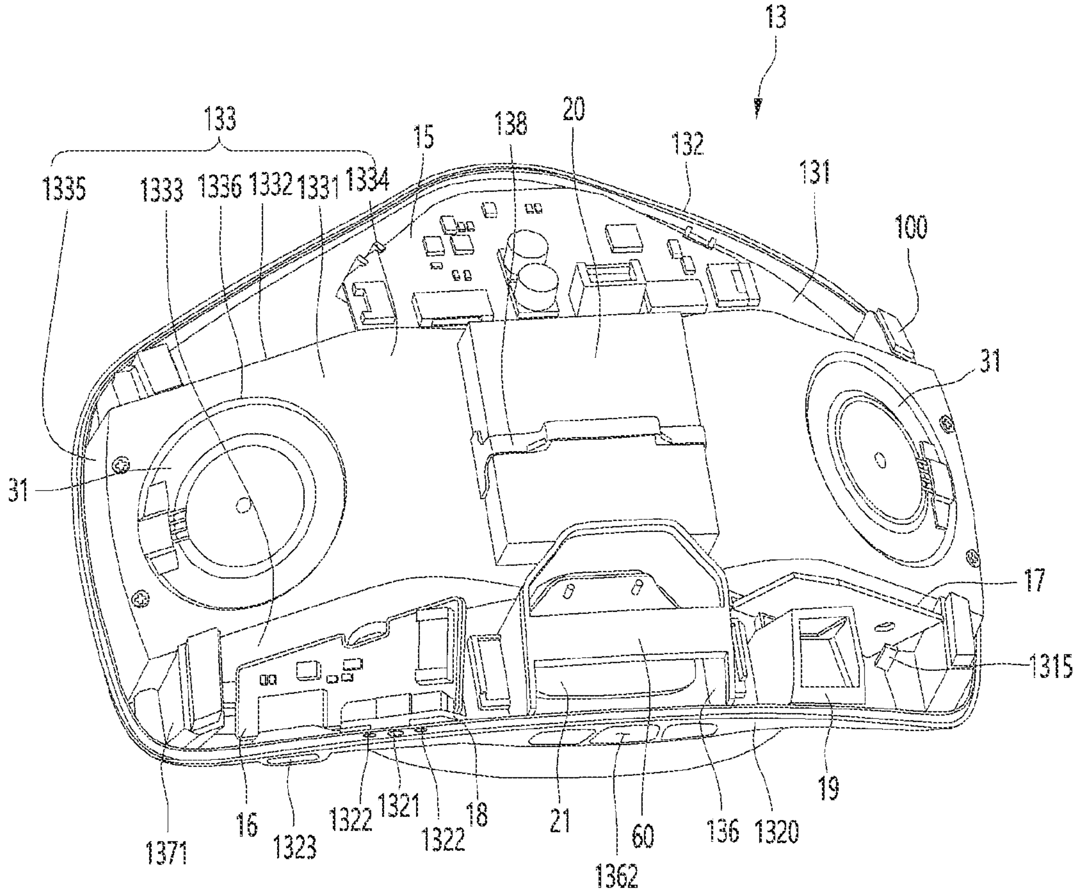
FIG. 6 is a front perspective view illustrating an example of a rear body constituting a mask apparatus.

FIG. 6 is a front perspective view of a rear body constituting a mask apparatus according to an implementation of the present disclosure.

Referring to FIG. 6, the rear body 13 constituting the mask apparatus 10 according to the implementation of the present disclosure can include a face cover portion 131 configured to cover a user's face, a fusion portion 132 bent forward from an edge of the face cover portion 131, and a pair of accommodation portions 133 protruding forward from the front surface of the face cover portion 131 and configured to accommodate the air cleaning module 30.

In some implementations, the fusion portion 132 is continuously formed along the top edge, both side edges, and the bottom edge of the face cover portion 131. In addition, the width of the fusion portion 132 in the front and rear direction that is bent along the lower surface edge of the face cover portion 131 and extends forward is the largest.

Among the fusion portions 132, a portion defined on the bottom edge of the face cover portion 131 can be specifically defined as an extended jaw 1320. The extended jaw 1320 can have a convexly rounded shape in such a way that the width in the front and rear direction increases from both side ends toward the center of the rear body 13.

In some implementations, the lower surface exhaust port 1362 can be defined at the center of the fusion portion 132 defined as an extended jaw, and a button hole 1321 can be defined at a position spaced apart from the lower surface exhaust port 1362 toward the side end portion of the rear body 13. In some cases, a power button can be inserted into the button hole 1321. In some cases, a pair of indication holes 1322 having a small diameter can be defined at left and right edges of the button hole 1321.

The light irradiated from the light emitting means provided at the power supply module 16 can be emitted to the outside through the pair of indication holes 1322. The light emitting means can include an LED module.

When light is emitted to the outside through any one of the pair of indication holes 1322, it can indicate that the power of the mask apparatus 10 is turned on. In addition, the remaining amount of the battery 20 can be predicted according to the color of light emitted through the other one of the pair of indication holes 1322.

In some implementations, a terminal insertion port 1323 can be defined at a position further spaced apart from the button hole 1321 toward the side end portion of the rear body 13. A universal Serial Bus (USB) cable can pass through the terminal insertion port 1323 and be inserted into a terminal connector 162 (see FIG. 9) defined in the power supply module 16. The battery 20 can be charged through the USB cable, and the version or function of the mask apparatus 10 can be updated or upgraded by data transmitted through the USB cable.

In some cases, the pair of accommodation portions 133 can be respectively provided at the left and right sides from the center of the rear body 13 and be symmetrical with respect to a vertical line passing through the center of the rear body 13.

Each of the accommodation portions 133 can protrude forward from the front surface of the face cover portion 131 to define a space for accommodating the air cleaning module 30. The accommodation portion 133 can include a seating surface 1331 on which the air cleaning module 30, specifically, the fan module 31 can be seated, a fastening surface 1335 coupling the outer edge of the seating surface 1331 and a side end portion of the face cover portion 131, and an air guide surface 1334 coupling the front surface of the face cover portion 131 and the inner edge of the seating surface 1331. The air guide surface 1334 can define the front surface of the air duct 102.

In addition, the accommodation portion 133 can further includes an upper surface 1332 coupling the upper ends of the seating surface 1331, the air guide surface 1334, and the fastening surface 1335 to the front surface of the face cover portion 131.

In addition, the accommodation portion 133 can further include a lower surface 1333 coupling the lower ends of the seating surface 1331, the air guide surface 1334, and the fastening surface 1335 to the front surface of the face cover portion 131.

In some cases, one or more fastening means, for example, fastening hooks 1338 and 1339 (see FIG. 17) can be provided at the fastening surface 1335.

In some implementations, a fan mounting hole 1336 can be defined at the seating surface 1331, wherein the upper surface 1332 and the lower surface 1333 extend horizontally and may extend in parallel to each other.

The fastening surface 1335 may be convexly rounded toward the outside of the rear body 13, wherein the fastening surface may be formed to be inclined toward the seating surface 1331 from the face cover portion 131.

The air guide surface 1334 may be defined such that the air suctioned by the fan module 31 can be guided to the discharge port 101 along the air guide surface 1334 by extending convexly and roundly from the seating surface 1331 toward the face cover portion 131.

In some implementations, the accommodation portion 133 can include a left accommodation portion provided at the left side from the center of the rear body 13 and a right accommodation portion provided at the right side from the center of the rear body 13. The left accommodation portion and the right accommodation portion can be spaced apart from the center of the rear body 13 by a predetermined distance, and the battery 20 can be provided in a space defined between the left accommodation portion and the right accommodation portion.

In some cases, a battery mounting portion 138 can be provided at the front surface of the rear body 13. One end portion of the battery mounting portion 138 can extend from either side of the left air guide surface 1334 and the right air guide surface 1334, and the other end portion thereof can be coupled to the other side of the left air guide surface 1334 and the right air guide surface 1334.

The battery mounting portion 138 can have an n-shape and be configured to support the front surface and both sides of the battery 20 and prevent the battery 20 from being separated from the rear body 13.

In addition, the central portion of the battery mounting portion 138 can further protrude forward to be selectively capable of mounting batteries of different sizes.

In some implementations, when the user sweats while wearing the mask apparatus 10, sweat can flow into the strap hole 1374 along the strap. In addition, even when the mask apparatus 10 is not worn, dust or other foreign substances can be introduced into the strap hole 1374.

In some cases, moisture introduced through the strap hole 1374 can corrode the electrical components provided at the front surface of the rear body 13, wherein there can be a risk of causing sparks around the electrical components due to the moisture or other foreign substances.

In some implementations, a waterproof sleeve 1371 can be provided at the front surface of the rear body 13. The waterproof sleeve 1371 can extend by a predetermined length forward from the front surface of the rear body 13 along the edge of the strap hole 1374.

In addition, a sealing cap 100 can be inserted into the waterproof sleeve 1371, so that the introduction of moisture and foreign substances through the strap hole 1374 into the space between the front body 12 and the rear body 13 can be prevented.

In some implementations, the exhaust flow path guide 136 can protrude forward from the front surface of the face cover portion 131 corresponding to the lower side of the battery mounting portion 138. In addition, a sealing cover 60 can be provided at the front end portion of the exhaust flow path guide 136.

In some cases, the exhaust flow path guide 136 can be provided below the battery mounting portion 138, wherein the lower end portion of the battery 20 provided at the battery mounting portion 138 is supported by the upper surface of the exhaust flow path guide 136. In some cases, it is possible to prevent the battery 20 from being pulled downward due to gravity while being inserted into the battery mounting portion 138.

The exhaust flow path guide 136 can define a substantially tunnel-shaped longitudinal cross-section, and a front surface exhaust port 1361 can be defined the face cover portion 131 corresponding to the inner side of the exhaust flow path guide 136.

At least one of the front surface exhaust port 1361 and the lower surface exhaust port 1362 can be defined in the form of an exhaust grill divided into a plurality of small exhaust ports by a plurality of grills or partition ribs. In addition, the front surface exhaust port 1361 can be selectively opened and closed by the exhaust valve 21.

Figure 7:
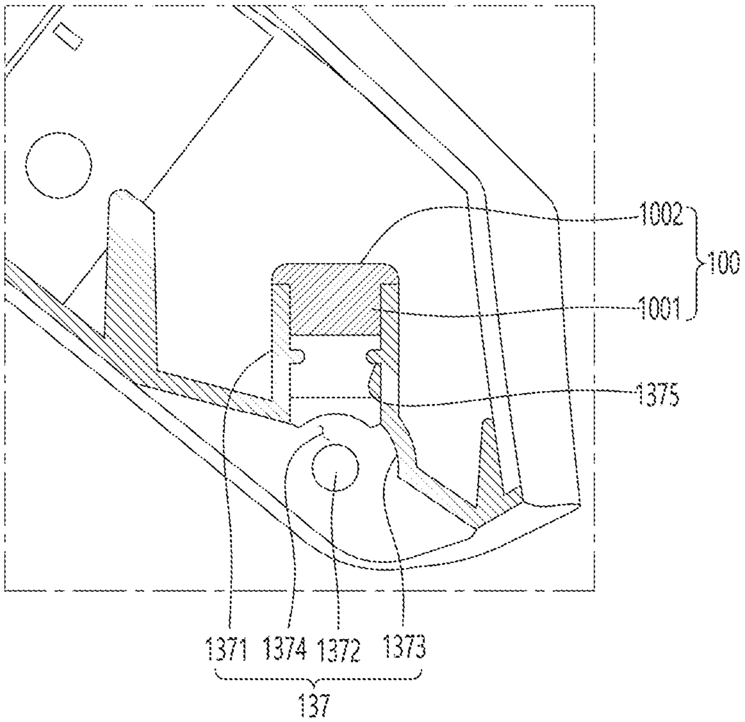
FIG. 7 is an enlarged cross-sectional view illustrating an exemplary waterproof sleeve structure to which the sealing cap of the mask apparatus is mounted.

FIG. 7 is an enlarged cross-sectional view illustrating a waterproof sleeve structure to which the sealing cap of the mask apparatus according to the implementation of the present disclosure is mounted.

Referring to FIG. 7, the waterproof sleeve 1371 can extend to a length spaced apart from the rear surface of the front body 12.

In some implementations, the introduction of moisture and foreign substances to a space between the front body 12 and the rear body 13 can be prevented by allowing the waterproof sleeve 1371 to extend to a length and be in contact with the rear surface of the front body 12. However, in a state where the rear body 13 and the front body 12 are coupled, there is a possibility that the end portion of the waterproof sleeve 1371 may not be in contact with the rear surface of the front body 12 due to assembly tolerance.

Alternatively, the end portion of the waterproof sleeve 1371 can be thermally fused to the rear surface of the front body 12, but there is a risk that the waterproof sleeve 1371 may melt or the shape of the front body 12 may change during the thermal-fusion process. Furthermore, a portion to which the end portion of the waterproof sleeve 1371 is thermally fused can be exposed on the front surface of the mask apparatus 10, which may cause an aesthetic problem.

In some cases, the sealing cap 100 having the same cross-sectional structure as the cross-sectional shape of the waterproof sleeve 1371 and having a shorter length than the waterproof sleeve 1371 can be inserted into the waterproof sleeve 1371.

The sealing cap 100 may be made of an elastically deformable material, for example, a silicone material or a rubber material. The sealing cap 100 can include a cap body 1001 inserted into the waterproof sleeve 1371, and a cap cover 1002 provided at an upper end of the cap body 1001. The width of the cap cover 1002 can be larger than the width of the cap body 1001, so that the cap cover 1002 is caught on the end portion of the waterproof sleeve 1371, so that the inserted limit of the sealing cap 100 can be determined.

In some cases, the sealing cap 100 can have the same shape as the inner shape of the waterproof sleeve 1371, and a stopper protrusion 1375 can protrude from the inner circumferential surface of the waterproof sleeve 1371. The insertion limit of the sealing cap 100 can be determined by the stopper protrusion 1375.

In addition, when the cross-sectional size of the sealing cap 100 is manufactured to be slightly larger than the cross-sectional size of the waterproof sleeve 1371 and the sealing cap is pushed into the waterproof sleeve 1371, the surface of the sealing cap 100 and the inner circumferential surface of the waterproof sleeve 1371 can be coupled with each other, thereby maximizing the sealing effect.

In some implementations, the waterproof sleeve 1371 can extend forward from the edge of the strap hole 1374 and extend obliquely to increase the cross-sectional area. Then, when the sealing cap 100 is inserted into the waterproof sleeve 1371, as the insertion depth of the sealing cap 100 increases and the amount of compression of the sealing cap 100 increases, the insertion limit of the sealing cap 100 can be determined.

Figure 8:
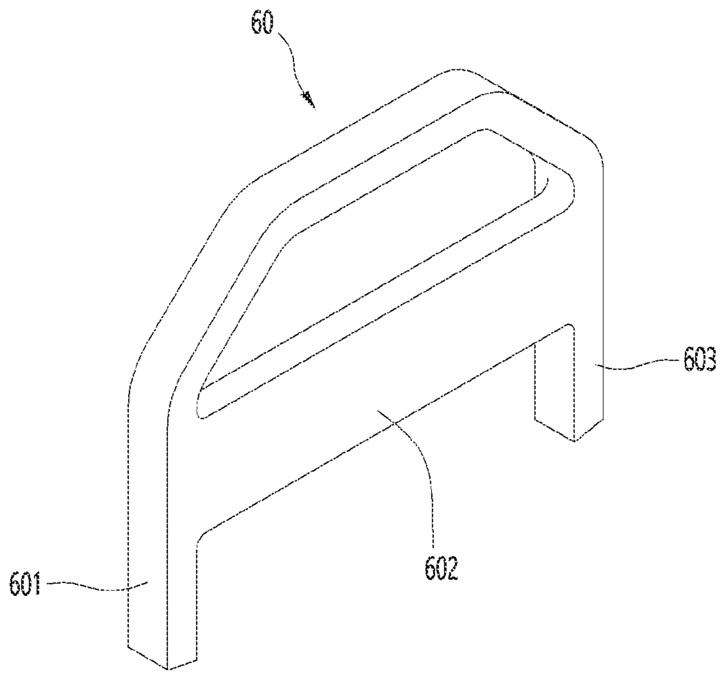
FIG. 8 is a front perspective view illustrating an example of the sealing cover inserted into the front end portion of the flow guide.
Figure 9:
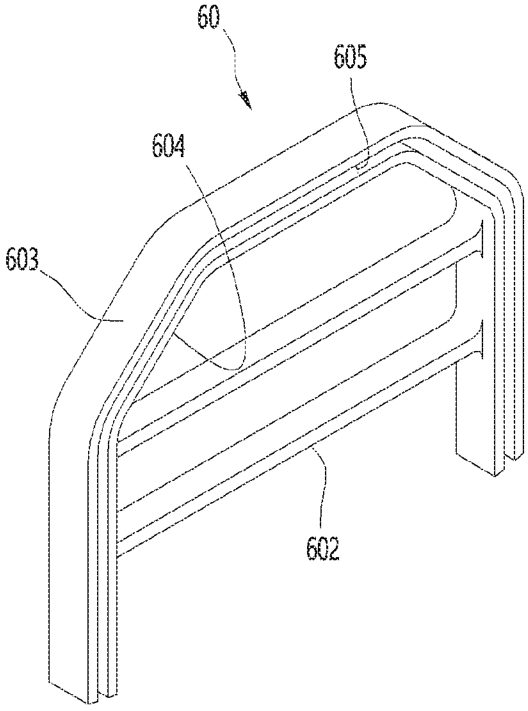
FIG. 9 is a rear perspective view illustrating an example of the sealing cover.

FIG. 8 is a front perspective view of the sealing cover inserted into the front end portion of the flow guide, and FIG. 9 is a rear perspective view of the sealing cover.

Referring to FIGS. 8 and 9, when the front body 12 is coupled to the rear body 13, the front end portion of the exhaust flow path guide 136 can be provided to be in close contact with the rear surface of the front body 12.

However, in some implementations, the front end portion of the exhaust flow path guide 136 can be spaced apart from the rear surface of the front body 12 to generate a gap due to assembly tolerance, the tolerance due to contraction after injection, or the like. In some cases, moisture or saliva can be introduced into a space defined between the front body 12 and the rear body 13 through the gap.

In some cases, the front end portion of the exhaust flow path guide 136 can be thermally fused to the rear surface of the front body 12. In some cases, a sealing cover 60 can be provided at the front end portion of the exhaust flow path guide 136.

In some cases, the sealing cover 60 can be made of an elastic material such as silicone or rubber.

The sealing cover 60 can include an n-shaped cover frame 601 extending along the front end portion of the exhaust flow path guide 136, an inner rib 604 extending rearward from the inner edge of the cover frame 601, an outer rib 603 extending rearward from the outer edge of the cover frame 601, and a connection rib 602 coupling the left and right portions of the cover frame 601.

A fitting groove 605 having a width corresponding to the thickness of the exhaust flow path guide 136 can be defined between the inner rib 604 and the outer rib 603, and the front end portion of the exhaust flow path guide 136 can be inserted in the fitting groove 605.

In some implementations, since the connection rib 602 is provided, it can be possible to prevent both end portions of the cover frame 601 being widened.

In some implementations, both lower end portions of the sealing cover 60 can be provided to be in contact with the extension jaws 1320 provided at the lower edge of the face cover portion 131. Then, when the front body 12 is coupled to the rear body 13, a gap is not generated between the lower end portion of the sealing cover 60 and the extension jaw 1320.

Figure 10:
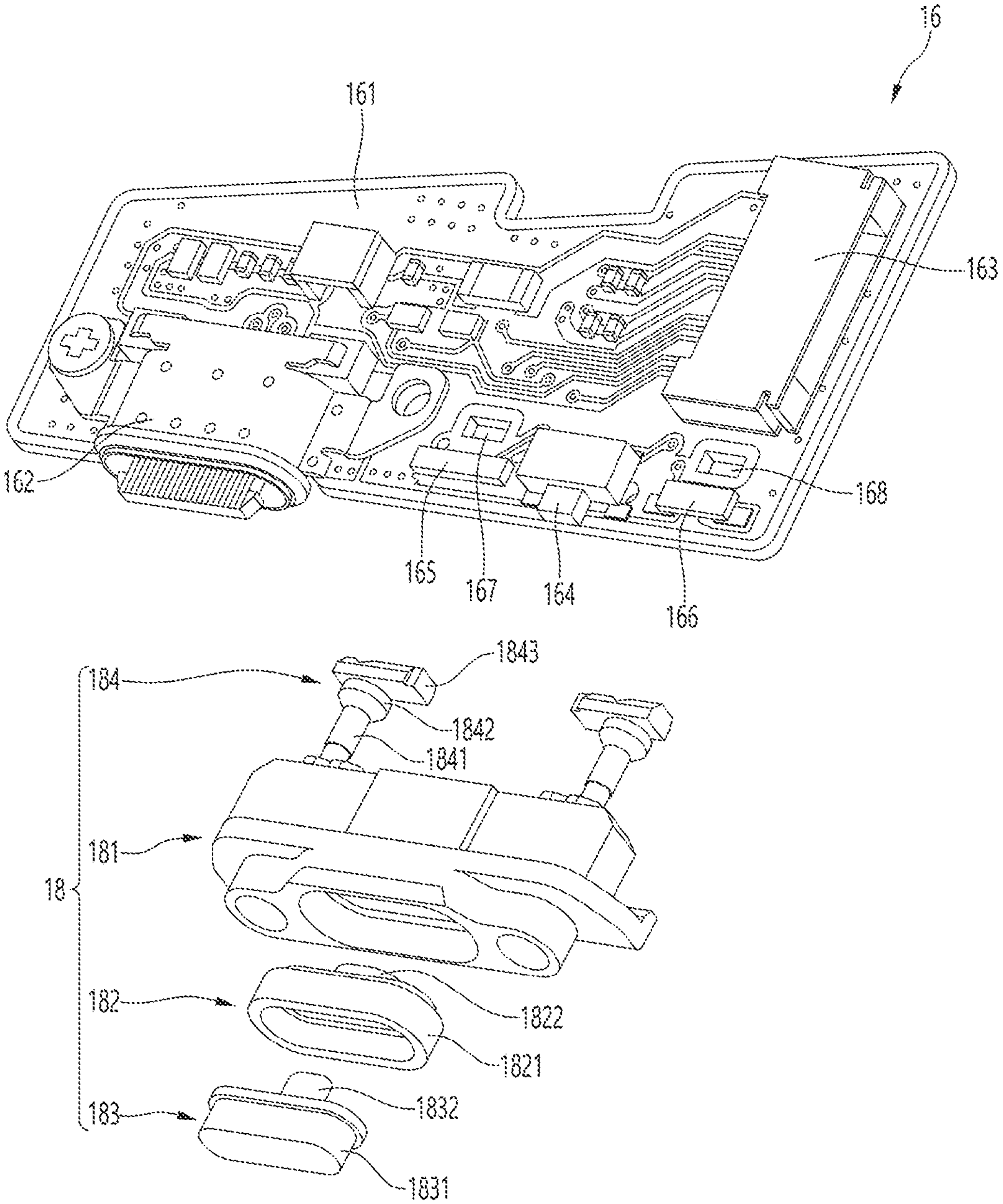
FIG. 10 is an exploded perspective view illustrating an example of a coupling relationship between a power module and an indicator module of a mask apparatus.

FIG. 10 is an exploded perspective view illustrating a coupling relationship between a power module and an indicator module of a mask apparatus according to an implementation of the present disclosure.

Referring to FIG. 10, the power supply module 16 provided at the mask apparatus 10 can be disposed at the lower right of the front surface of the rear body 13, and the indicator module 18 can be assembled and coupled to the substrate of the power supply module 16.

In some cases, the power supply module 16 can include a power substrate 161 and a plurality of electrical components provided at the front surface of the power substrate 161. The plurality of electrical components can include at least one of a terminal connector 162, a connector 163, a power switch 164, and LEDs 165 and 166.

The terminal connector 162 can perform an interface function for charging the battery 200 by inserting the USB cable from the outside, or updating or upgrading the version or function of the mask apparatus 10 by the data transmitted through the USB cable.

The connector 163 can perform a function for providing power to the main control module 15 by connecting the PCB of the main control module 15.

The power switch 164 can be turned on or off by the power button 183 provided at the button hole 1321. In some cases, the power switch 164 can be provided at the lower end of the left side of the power substrate 161.

In some cases, when the power switch 164 is turned on by the operation of the power button 183, power is supplied to the electric components provided at the mask apparatus 10, and when the power switch 164 is turned off by the operation of the power button 183, the power supply to the electric components is cut off.

In some cases, the LEDs 165 and 166 can emit light to the outside to indicate the operation state of the mask apparatus 10. The light irradiated from the LEDs 165 and 166 can be diffused and guided through the indicator module 18 to be emitted to the outside of the mask apparatus 10. When the indicator module 18 is coupled to the power substrate 161, the LEDs 165 and 166 can be shielded by the indicator module 18 or accommodated in the indicator module 18.

In some examples, the LEDs 165 and 166 can be disposed to be spaced apart from each other on the both sides with respect to the power switch 164 in the left and right direction. The LEDs 165 and 166 can include a first LED 165 spaced apart from the right side of the power switch 164 and a second LED 166 spaced apart from the left side of the power switch 164.

In addition, mounting holes 167 and 168 for mounting the indicator module 18 can be defined at the power substrate 161. The mounting holes 167 and 168 can be portions to which a portion of the indicator module 18 is caught and coupled to each other in a hook manner.

In some cases, the mounting holes 167 and 168 are respectively spaced apart from each other on both sides with respect to the power switch 164 in the left and right direction. The mounting holes 167 and 168 can include a first mounting hole 167 spaced apart from the right side of the power switch 164 and a second mounting hole 168 spaced apart from the left side of the power switch 164. The first mounting hole 167 can be spaced apart from the upper side of the first LED 165, and the second mounting hole 168 can be spaced apart from the upper side of the second LED 166.

The indicator module 18 can be provided at the power substrate 161 and configured to focus the light of the LEDs 165 and 166 to diffuse and guide the light to the outside of the mask apparatus 10.

In some implementations, the indicator module 18 can include an indicator body 181, a button sealing portion 182 inserted inside the bottom surface of the indicator body 181, a power button 183 inserted into the button sealing portion 182, and a light guide portion 184 inserted into the indicator body 181.

In some cases, the button sealing portion 182 can include a sealing portion body 1821 defining an insertion space into which the power button 183 is inserted. The sealing portion body 1821 can include a button mounting groove 1813 (see FIG. 11) defined at the bottom surface of the button mounting portion 1812, wherein the power button 183 is inserted therein. The sealing portion body 1821 can be disposed to surround the inside of the button mounting groove 1813. The sealing portion body 1821 can be made of a rubber or silicone material.

In some cases, the insertion space of the sealing portion body 1821 can be defined by being recessed upwardly from the bottom surface of the sealing portion body 1821. When the button sealing portion 182 is inserted into the button mounting groove 1813, the bottom surface of the sealing portion body 1821 can define a single surface without a step difference with the bottom surface of the button mounting portion 1812.

In some cases, the sealing portion body 1821 can be configured to prevent moisture or foreign substances from being introduced into the space between the power button 183 and the button hole 1321 of the rear body 13. In some cases, the sealing portion body 1821 can be disposed to face the button hole 1321 and have a cross-sectional area greater than that of the button hole 1321. Accordingly, a plurality of electrical components provided at the power substrate 161 can be waterproofed and protected from the outside.

In addition, a through-boss 1822 through which a portion of the power button 183 passes can be provided at the upper surface of the sealing portion body 1821. The through-boss 1822 can have an opening through which the power button 183 passes and can protrude upward from the center of the upper surface of the sealing portion body 1821.

In some cases, the through-boss 1822 can be disposed to face the power switch 164. Accordingly, when the power button 183 is pressed, a portion of the power button 183 may pass through the through-boss 1822 to be in contact with the power switch 164. In some cases, the power switch 164 can include a tact switch.

The power button 183 can be configured to operate the power switch 164 by being pressed by a user. The power button 183 can be exposed to the outside of the mask apparatus 10 through the button hole 1321 while being inserted into the button sealing portion 182.

According to one implementation, the power button 183 can be configured to be movable by a predetermined distance in the vertical direction between the button sealing portion 182 and the rear body 13. In some cases, an elastic member can be interposed between the power button 183 and the button sealing portion 182. The elastic member can include a spring.

In some cases, the power button 183 can include a button body 1831 provided at the button sealing portion 182 and configured to be pressed by the user, and a button protrusion 1832 protruding from the upper surface of the button body 1831 and configured to be in contact with the power switch 164.

The button protrusion 1832 can protrude upward from the center of the upper surface of the button body 1831. The button protrusion 1832 can be disposed to face the through-boss 1822. Accordingly, when the button body 1831 is pressed by an external force, the button protrusion 1832 can pass through the through-boss 1822 to press the power switch 164.

In some implementations, the light guide portion 184 can be accommodated in the indicator body 181, and configured to guide the light emitted from the LEDs 165 and 166 toward the indication hole 1322. A pair of the light guide portions 184 can be respectively accommodated inside the pair of reflectors 1815. The light guide portion 184 can be provided at the upper surface of the base 1811, and a portion of the light guide portion 184 can be inserted into the light guide portion hole 1814.

In some cases, the light guide portion 184 can include a tube portion 1841 provided in a tubular shape and inserted into the indication hole 1322, an extension tube 1842 expanding and extending from the upper end of the tube portion 1841, and a fixing portion 1843 defined at the upper end of the extension tube 1842 and fixed to the upper surface of the base 1811.

In some cases, a center of the tube portion 1841 can coincide with a center of the indication hole 1322. The extension tube 1842 can have an outer diameter of an area corresponding to an inner diameter of the light guide portion hole 1814 and can be inserted into the upper end of the light guide portion hole 1814. In some cases, the fixing portion 1843 can be disposed to face the LEDs 165 and 166 while being fixed to the upper surface of the base 1811. In one example, an opening having fluid communication with the extension tube 1842 can be defined in the fixing portion 1843.

Accordingly, the light generated by the LEDs 165 and 166 can be focused by the reflector 1815 and guided into the light guide portion 184. In addition, the light passing through the light guide portion 184 can be diffused and emitted to the outside of the mask apparatus 10 through the indication hole 1322.

Figure 11:
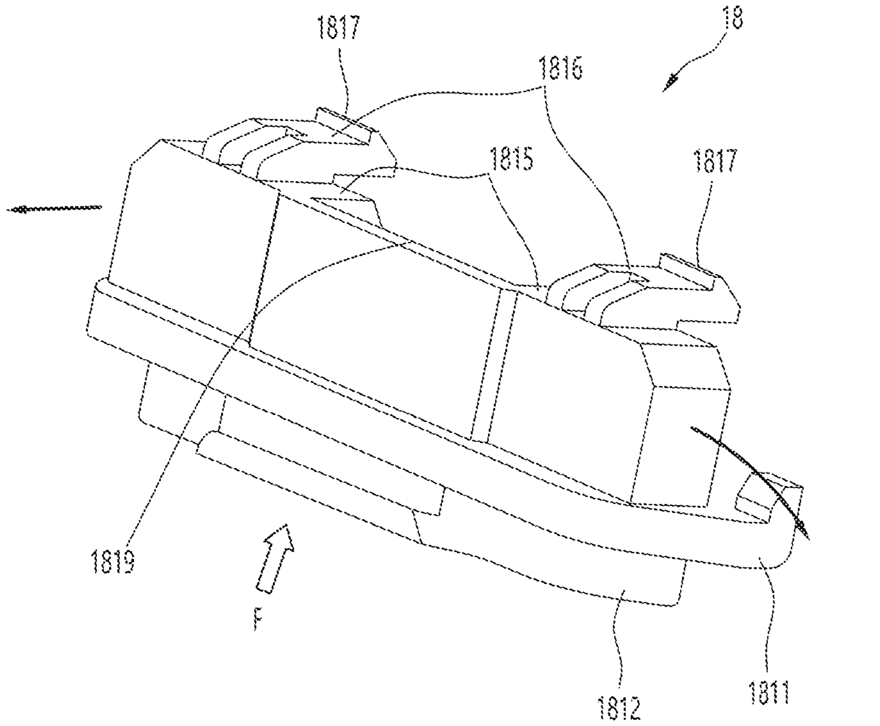
FIG. 11 is a front perspective view illustrating an example of an indicator body constituting an indicator module.
Figure 12:
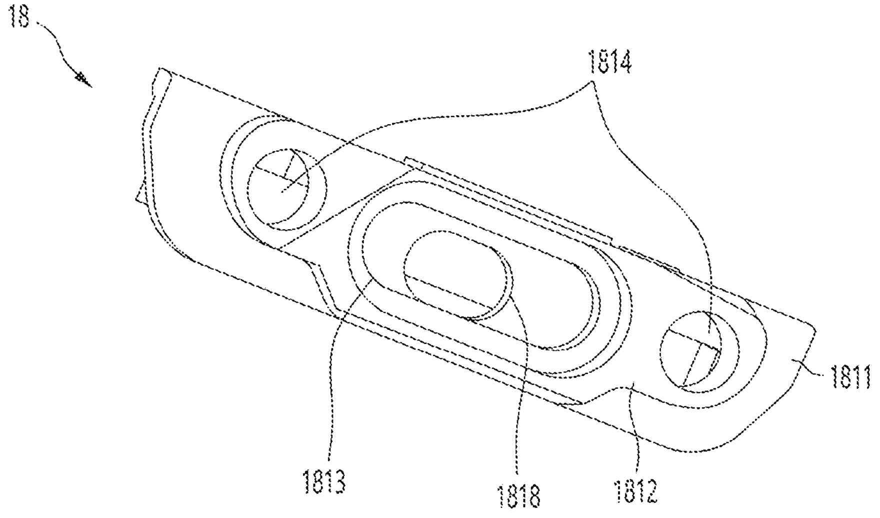
FIG. 12 is a bottom view illustrating an example of the indicator body.
Figure 13:
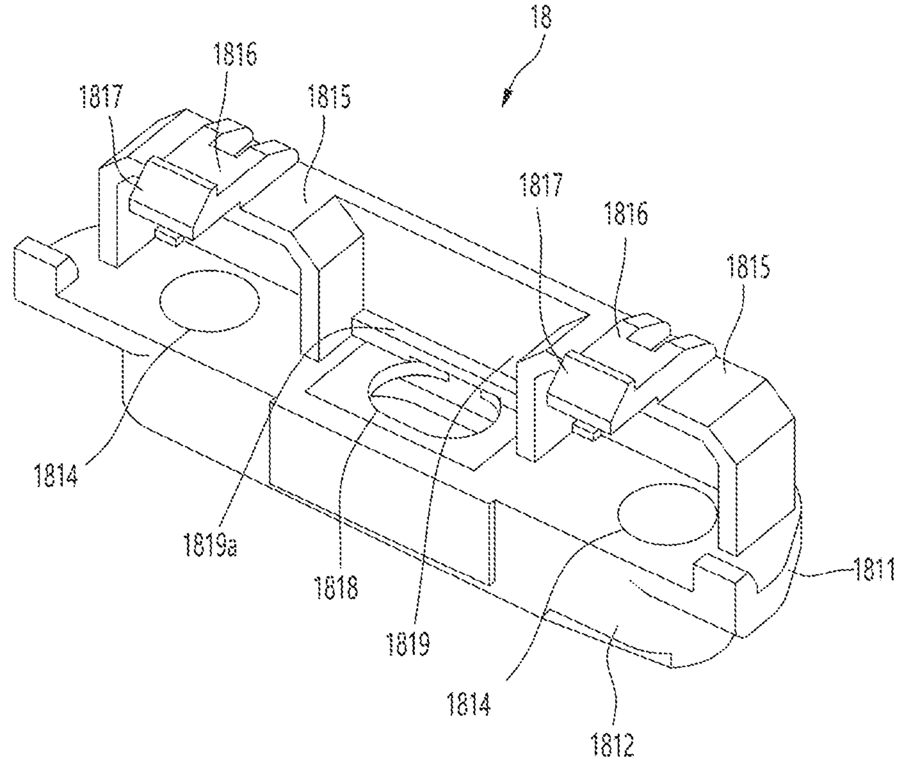
FIG. 13 is a rear perspective view illustrating an example of the indicator body.

FIG. 11 is a front perspective view of an indicator body constituting an indicator module according to an implementation of the present disclosure, FIG. 12 is a bottom view of the indicator body, and FIG. 13 is a rear perspective view of the indicator body.

Referring to FIGS. 11 to 13, the indicator body 181 constituting the indicator module 18 according to the implementation of the present disclosure can include a base 1811, a button mounting portion 1812 extending downward from the bottom surface of the base 1811, a pair of reflectors 1815 extending upward from both sides of the upper surface of the base 1811, and a curving prevention wall 1819 coupling the pair of reflectors 1815. In addition, the indicator body 181 can further include catching portions 1816 and 1817 respectively provided at upper surfaces of the pair of reflectors 1815.

In some implementations, the base 1811 has a shape extending to be elongated in the left and right direction. A center of the base 1811 can be aligned with a center of the power switch 164. A button through-hole 1818 through which the power button 183 passes can be defined at the center of the upper surface of the base 1811. When the power button 183 is pressed, the power button 183 can pass through the button through-hole 1818 to press the power switch 164.

The button mounting portion 1812 can be defined to be elongated in the left and right direction from the bottom surface of the base 1811. In one example, the center of the button mounting portion 1812 can be aligned with the center of the base 1811. A button mounting groove 1813 into which the power button 183 can be inserted is defined in the center of the button mounting portion 1812. The button mounting groove 1813 can be defined by being recessed upwardly from the bottom surface of the button mounting portion 1812. The button mounting groove 1813 can be coupled to the button through-hole 1818.

In some cases, a light guide portion hole 1814 into which the light guide portion 184 is inserted can be defined at a bottom surface of the button mounting portion 1812. The light guide portion hole 1814 can be defined to penetrate upwardly from the bottom surface of the button mounting portion 1812. In one example, the light guide portion hole 1814 can penetrate from the bottom surface of the button mounting portion 1812 to the upper surface of the base 1811.

The light guide portion hole 1814 can be provided to be spaced apart from each other on both sides of the button mounting groove 1813. The pair of light guide portion holes 1814 can be coupled to the pair of indication holes 1322 to face each other.

In some implementations, the reflector 1815 defines an accommodation space configured to accommodate the LEDs 165 and 166 and to focus the light emitted from the LEDs 165 and 166. The reflectors 1815 can be disposed to be spaced apart from each other on both sides of the upper surface of the base 1811 with respect to the button through-holes 1818.

The reflector 1815 can have a shape extending upward from both sides of the upper surface of the base 1811, and include a front surface, both sides, and an upper surface closed and a rear surface open. In some cases, when the indicator module 18 is coupled to the power substrate 161, the LEDs 165 and 166 provided at the power substrate 161 are accommodated in the internal space of the reflector 1815. The accommodation space of the reflector 1815 can be coupled to the light guide portion hole 1814.

In some cases, the catching portions 1816 and 1817 can be defined at the reflector 1815 and coupled to the mounting holes 167 and 168. The catching portions 1816 and 1817 can include an extension portion 1816 extending from the upper surface of the reflector 1815 and a hook portion 1817 defined at an end portion of the extension portion 1816.

The extension portion 1816 can extend rearward from the upper surface of the reflector 1815, and the hook portion 1817 may be provided at an end portion thereof. The pair of hook portions 1817 can be respectively hooked to the pair of mounting holes 167 and 168, so that the indicator module 18 can be stably fixed to the power substrate 161 without shaking.

When the user presses the power button 183 toward the power switch 164 wherein the indicator module 18 is assembled to the mask apparatus, the center of the base 1811 can be curved upward and convexly to be rounded by the force of pressing the power button 183. In addition, as the base 1811 is curved, the pair of reflectors 1815 can be spread apart or curved in a direction away from each other. In one example, excessive force can be transmitted to the power switch 164 to cause damage of the power switch.

In some implementations, the pair of reflectors 1815 can be coupled by the curving prevention wall 1819. The curving prevention wall 1819 can couple inner edges of the front surfaces of the pair of reflectors 1815. In some cases, a stepped portion 1819*a* may be provided at a position where the lower end of the curving prevention wall 1819 and the upper surface of the base 1811 meet.

In some cases, due to the curving prevention wall 1819 and the stepped portion 1819*a*, even when an excessive force is applied to the power button 183, the curving phenomenon of the base 1811 may not occur, so that the mounted components on the power substrate 161 can be prevented from being damaged or from disturbing the alignment between the light guide portion 184 and the indication hole.

Figure 14:
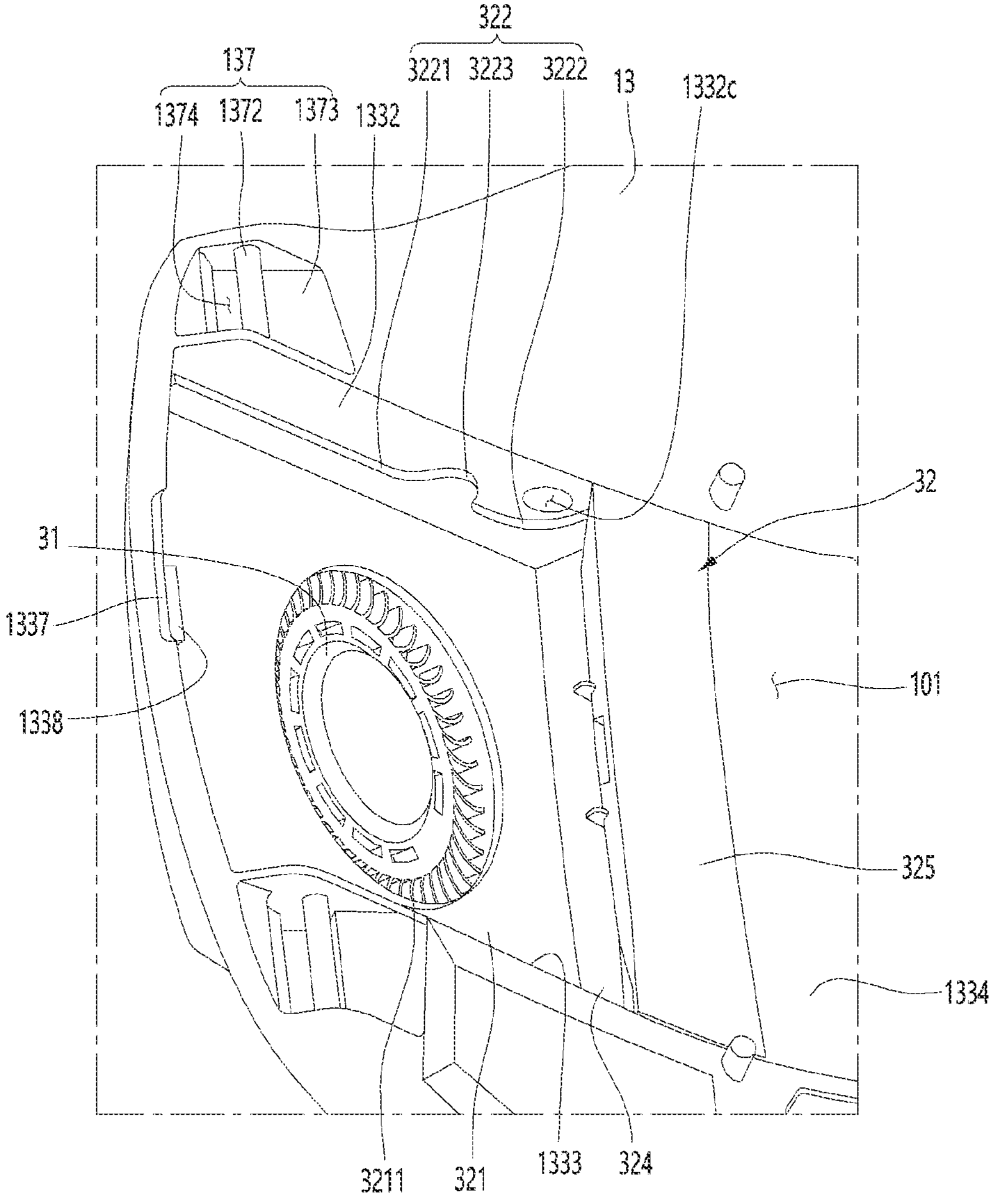
FIG. 14 is an enlarged perspective view illustrating an example of the rear surface of the rear body in a state where the filter housing and the filter are removed.
Figure 15:
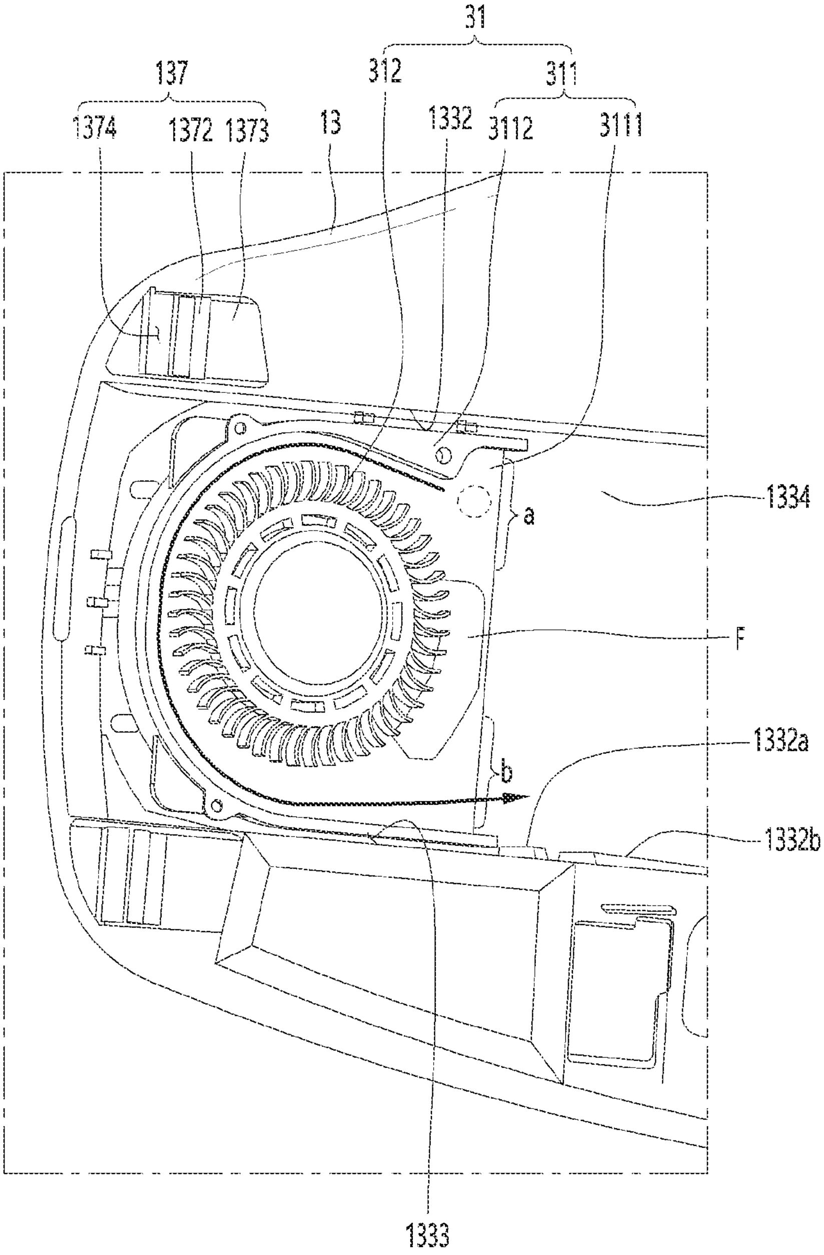
FIG. 15 is an enlarged perspective view illustrating an example of the rear surface of the rear body in a state where the flow guide is removed.
Figure 16:
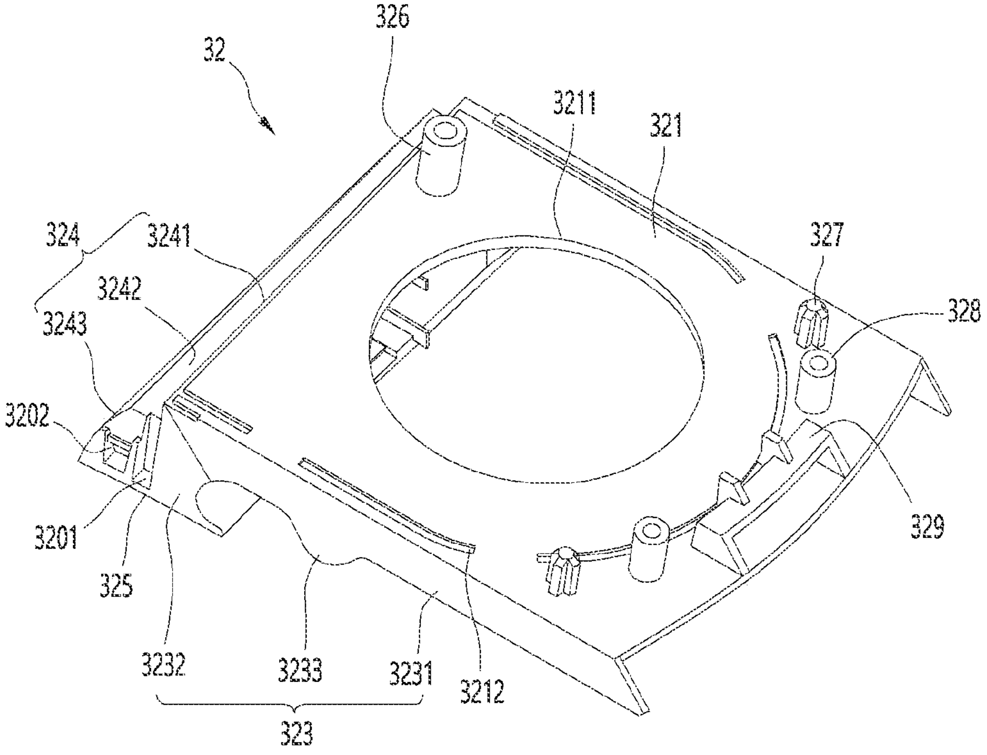
FIG. 16 is a front perspective view illustrating an example of the flow guide.

FIG. 14 is an enlarged perspective view illustrating the rear surface of the rear body wherein the filter housing and the filter are removed, FIG. 15 is an enlarged perspective view illustrating the rear surface of the rear body wherein the flow guide is removed, and FIG. 16 is a front perspective view of the flow guide.

Referring to FIGS. 14 to 16, the accommodation portion 133 configured to accommodate the air cleaning module 30 can include a seating surface 1331 on which the air cleaning module 30, specifically, the fan module 31 is seated, a fastening surface 1335 coupling the outer edge of the seating surface 1331 to the side end portion of the face cover portion 131, and an air guide surface 1334 coupling the front surface of the cover portion 131 to the inner edge of the seating surface 1331. In some cases, the air guide surface 1334 can define the front surface of the air duct 102.

In some implementations, a flow guide hook 1339 (see FIG. 18) and a filter hook 1338 can be provided at the fastening surface 1335 to be spaced apart from each other in the front and rear direction, respectively. The flow guide hook 1339 can be located closer to the seating surface 1331 than the filter hook 1338.

In addition, a gripping groove 1337 can be provided at the side end of the rear surface of the rear body 13 corresponding to the rear of the filter hook 1338.

In addition, the accommodation portion 133 can further include an upper surface 1332 coupling the upper ends of the seating surface 1331, the air guide surface 1334, and the fastening surface 1335 and the front surface of the face cover portion 131.

In addition, the accommodation portion 133 can further include a lower surface 1333 coupling the lower ends of the seating surface 1331, the air guide surface 1334, and the fastening surface 1335 and the front surface of the face cover portion 131.

In some cases, a mounting guide 1332*a*, a fixing guide 1332*b*, and a hinge hole 1332*c* can be defined at the upper surface 1332 and the lower surface 1333 of the accommodation portion 133, respectively.

The mounting guide 1332*a* can be provided in the form of a rib extending by a predetermined length in a direction from the rear surface to the front surface of the mask body 11. The fixing guide 1332*b* can protrude at a portion spaced apart from the mounting guide 1332*a* in the center direction of the mask body 11.

In some cases, the hinge hole 1332*c* can be provided in the form of a long hole at a position spaced apart from the mounting guide 1332*a* toward the side end portion of the mask body 11. The hinge hole 1332*c* can be a hole into which the hinge 346 (see FIG. 17) of the filter housing 34 is inserted and may have a non-circular shape, for example, an elliptical long hole.

In addition, the hinge hole 1332*c* can extend obliquely in a direction closer to the rear surface of the mask body 11 toward the side end portion of the mask body 11. In some cases, the elliptical hinge hole 1332*c* can be provided such that the distance from one end portion of the hinge hole 1332*c* that is close to the center of the mask body 11, to the rear surface of the mask body 11 may be longer than the distance from the other end portion of the hinge hole 1332*c* close to the side end portion of the mask body 11, to the rear surface of the mask body 11.

In some cases, the hinge hole 1332*c* can extend obliquely in the form of a long hole such that when the end portion of the filter housing 34 is rotated to separate the filter 33, the filter housing 34 is prevented from being interfered with the rear flange 325 of the flow guide 32.

In some cases, wherein the fastening hook 344 of the filter housing 34 (see FIG. 17) is separated from the filter hook 1338 protruding from the fastening surface 1335, the filter housing 34 can be rotated while being pulled toward the side end portion of the mask body 11. In one example, the hinge 346 of the filter housing 34 can rotate while moving from one end portion of the long-hole-shaped hinge hole 1332*c* toward the other end portion thereof and is in a state as illustrated in FIG. 18.

According to the structure of the hinge hole 1332*c* of the present disclosure, in some examples, the filter housing 34 does not interfere with the rear flange 325, and the rotation amount (or opening angle) of the filter housing 34 can become larger compared to when the hinge hole 1332*c* is circular.

In some implementations, the fan module 31 can include a fan housing 311 and a fan 312. In addition, the fan housing 311 can include a base 3111 seated on the seating surface 1331 of the accommodation portion 133 and a shroud 3112 protruding from the edge of the base 3111 by a predetermined height. The shroud 3112 can be surrounded along an edge of the base 3111, and a middle portion thereof can extend to be rounded along the outer periphery of the fan 312.

A printed circuit board (PCB) F configured to drive the fan motor can be disposed on the base. The PCB can include a flexible PCB that can be curved.

In some cases, the shroud 3112 can extend from one edge of one end portion of the base 3111 in a straight line, and at a certain point along the outer periphery of the fan 313, extend to be rounded with a predetermined curvature, and then extend in a straight line to the other edge of one end portion of the base 3111.

A guide protrusion 3113 can protrude from the inner surface of one end portion of the shroud 3112, wherein air rotates from the space between the guide protrusion 3113 and the fan 312, the air rotating in the rotation direction of the fan and is discharged toward the side end portion of the shroud 3112 facing the guide protrusion 3113.

The portion where the guide protrusion 3113 is defined, that is, the portion where the rotation of the air starts can be defined as the inlet a, and the portion through which the air rotating along the shape of the shroud 3112 exits can be defined as the outlet b.

The air exiting through the outlet b can be supplied to the user's face through the discharge port 101.

In some implementations, the flow guide 32 can be provided at the rear surface of the fan module 31, wherein the fan module is provided at the accommodation portion. In one example, the flow guide 32 can be provided at the rear end of the shroud 3112.

In some implementations, the flow guide 32 can include a mount plate 321 covering the open rear surface of the fan housing 311, a duct flange 324 bent and extended from one end of the mount plate 321, upper flanges 322 bent and extended from the upper ends of the mount plate 321 and the duct flange 324, lower flanges 323 bent and extended from the lower ends of the mount plate 321 and the duct flange 324, and a rear flange 325 extending in a direction crossing the duct flange 324 at an end portion of the duct flange 324.

In some cases, the other end of the mount plate 321 can be in close contact with the fastening surface 1335 of the accommodation portion 133. In addition, a communication hole 3211 can be defined in the mount plate 321 and configured to function as a suction port of the fan module 31.

The upper flange 322 can include a mount upper flange 3221, a duct upper flange 3222, and a guide shoulder 3223.

The mount upper flange 3221 can be vertically bent at the upper end of the mount plate 321 and extend to have a predetermined width. The duct upper flange 3222 can be vertically bent from the upper end of the duct flange 324 and extend to have a predetermined width. The mount upper flange 3221 and the duct upper flange 3222 can be provided as one body to form an L-shape.

In some cases, the lower flange 323 can include a mount lower flange 3231, a duct lower flange 3232, and a guide shoulder 3233.

In some cases, the mount lower flange 3231 can be vertically bent at the lower end of the mount plate 321 and extend to have a predetermined width. In some cases, the duct lower flange 3232 can be vertically bent at the lower end of the duct flange 324 and extend to have a predetermined width.

The upper flange 322 and the lower flange 323 can have a symmetrical shape with respect to a line or a plane that bisects the mount plate 321 vertically.

In some implementations, the upper flange 322 can be in close contact with the upper surface 1332 of the accommodation portion 133, and the lower flange 323 can be in close contact with the lower surface 1333 of the accommodation portion 133. In addition, when the flow guide 32 is seated in the accommodation portion 133, as illustrated in FIG. 4, the duct flange 324 can define the rear surface of the air duct 102, and the air guide surface 1334 of the accommodation portion 133 can define the front surface of the air duct 102.

In some cases, when the flow guide 32 is provided at the accommodation portion 133, the rear flange 325 can define a portion of the rear surface of the mask body 11. In addition, one end portion of the rear flange 325 can be in contact with the end portion of the filter housing 34, and the other end portion of the rear flange 325 can define a side end portion of the discharge port 101.

In some cases, the outlet end of the air duct 102 and an end portion of the air guide surface 1334 can define the discharge port 101.

In addition, a space in which the filter 33 can be accommodated, can be defined by a portion of the mount plate 321, the duct flange 324, the upper flange 322, the lower flange 323, and the rear flange 325.

In some cases, the upper flange 322 and the lower flange 323 can support a portion of an upper side and a portion of a lower side of the four sides of the filter 33, respectively, so the filter is prevented from being swung in the vertical direction when the user wears the mask apparatus 10.

In addition, the duct flange 324 can include a filter support surface 3241 bent and extended from the side end portion of the mount plate 321 and configured to support a portion of the side of the filter 33, a bent surface 3242 bent and extended from the end portion of the filter support surface 3241, and an air guide surface 3243 rounded with a predetermined curvature at the end portion of the bent surface 3242.

In some examples, the air guide surface 3243 of the duct flange 324 can be provided at a position facing the air guide surface 1334 and the front and rear surfaces of the air duct 102 can be defined by the two air guide surfaces 3243 and 1334.

In some cases, due to the rounded shape of the air guide surface 3243, the air duct 102 may have a shape in which a cross-sectional area increases from a suction port toward the discharge port 101, wherein the suction port is in fluid communication with the discharge port of the fan module 31.

in some implementations, a guide groove 3201 and a fixing groove 3202 can be defined in each of the duct upper flange 3222 of the upper flange 322 and the duct lower flange 3232 of the lower flange 323.

The guide groove 3201 can be defined at the bent surface 3242 to any position spaced apart from the rear flange 325 downward. When the flow guide 32 is provided at the accommodation portion 133, the mounting guide **1332*a* can be inserted into the guide groove 3201** and configured to move along the guide groove.

In some cases, the mounting guide **1332*a* can be provided at the duct upper flange 3222 of the flow guide 32, and the guide groove 3201 can be provided at the upper surface 1332 and the lower surface 1333 of the accommodation portion 133**.

In some cases, the mounting guide **1332*a* can be inserted into the guide groove 3201 to prevent a portion of the air discharged from the fan module 31 to the air duct 102 from leaking. In one example, it is possible to prevent a portion of the air discharged to the air duct 102 from leaking through a gap between the upper surface 1332 of the accommodation portion 133 and the upper flange 322 of the flow guide 32, and a gap between the lower surface 1333 of the accommodation portion 133 and the lower flange 323 of the flow guide 32**.

In addition, the fixing guide **1332*b* can be press-fitted into the fixing groove 3202, such that the flow guide 32 can be coupled to the accommodation portion 133 without shaking. In some cases, the positions of the fixing guide 1332*b* and the fixing groove 3202 can also be interchanged with each other, similarly to the mounting guide 1332*a* and the guide groove 3201**.

In some implementations, a fan support rib 3212 can be provided at the front surface of the mount plate 321, that is, a surface covering the open surface of the fan housing 311.

In some cases, the fan support rib 3212 can protrude along the shape of the shroud 3112 constituting the fan housing 311 and extend along the outer surface of the shroud 3112, so that the fan housing 311 can be stably supported. The communication hole 3211 can be defined in an inner region of the fan support rib 3212.

In addition, a fan fixing boss 327 can protrude from a front edge of the mount plate 321 corresponding to an outer region of the fan support rib 3212. The fan fixing boss 327 can include a first fan fixing boss provided at an upper edge of the outer side end portion of the mount plate 321 and a second fan fixing boss provided at a lower edge thereof. The outer side end portion of the mount plate 321 can define an end portion in close contact with the fastening surface 1335 of the accommodation portion 133.

In addition, a fastening boss 328 can protrude at any position spaced apart from the fan fixing boss 327. The fastening boss 328 can be configured to fix the flow guide 32 to the seating surface 1331 of the accommodation portion 133.

In some implementations, the fastening boss 328 can include a first fastening boss provided at a position spaced apart from the first fan fixing boss and a second fastening boss provided at a position spaced apart from the second fan fixing boss. In some cases, the number of the fastening boss 328 and the fan fixing boss 327 may not be limited to the presented implementation.

In addition, a fastening hook 329 can protrude from an outer edge of the front surface of the mount plate 321, that is, a region adjacent to an outer side end portion of the mount plate 321. The fastening hook 329 can be caught on the flow guide hook 1339 protruding from the fastening surface 1335 of the accommodation portion 133 to prevent the flow guide 32 from being detached.

In one example, the fastening hook 329, the fastening boss 328, and the fan fixing boss 327 can be provided symmetrically with respect to a line dividing the mount plate 321 in the vertical direction.

In some implementations, in the manufacturing process of the base 3111, when curving of the base 3111 occurs or pressure is applied to the mount plate 321 of the flow guide 32, the PCB F of the fan module 31 can interfere with the mount plate 321 and be damaged, or the blade of the fan 312 can touche the mount plate 321 and generate noise.

In some cases, a curving prevention boss 326 can protrude from one side of the front surface of the mount plate 321. In one example, the curving prevention boss 326 can protrude from the edge of the front surface of the mount plate 321 adjacent to the duct flange 324.

In addition, in order to prevent the flow of air discharged from the fan module 31 from being obstructed by the curving prevention boss 326, the curving prevention boss 326 can be provided at the edge corresponding to the side of the inlet a of the fan module 31 among the edges of the front surface of the mount plate 321.

Therefore, when the flow guide 32 is seated on the shroud 3112 of the fan module 31, the end portion of the curving prevention boss 326 can be in contact with the surface of the base corresponding to the inlet a region. (see the dotted circle illustrated in FIG. 15).

In some cases, the curving prevention boss 326 can prevent any noise generated due to the interference of the PCB F by the curving of the base 3111 or an external force acting on the mount plate 321, or the contact of the blade of the fan 312 with the mount plate 321.

In one example, the curving prevention boss 326 can be respectively formed on the upper and lower edges of the front surface of the mount plate 321. For example, the two curving prevention bosses 326 can protrude from positions symmetrical to each other, and be in contact with the inlet a region and the outlet b region.

Figure 17:
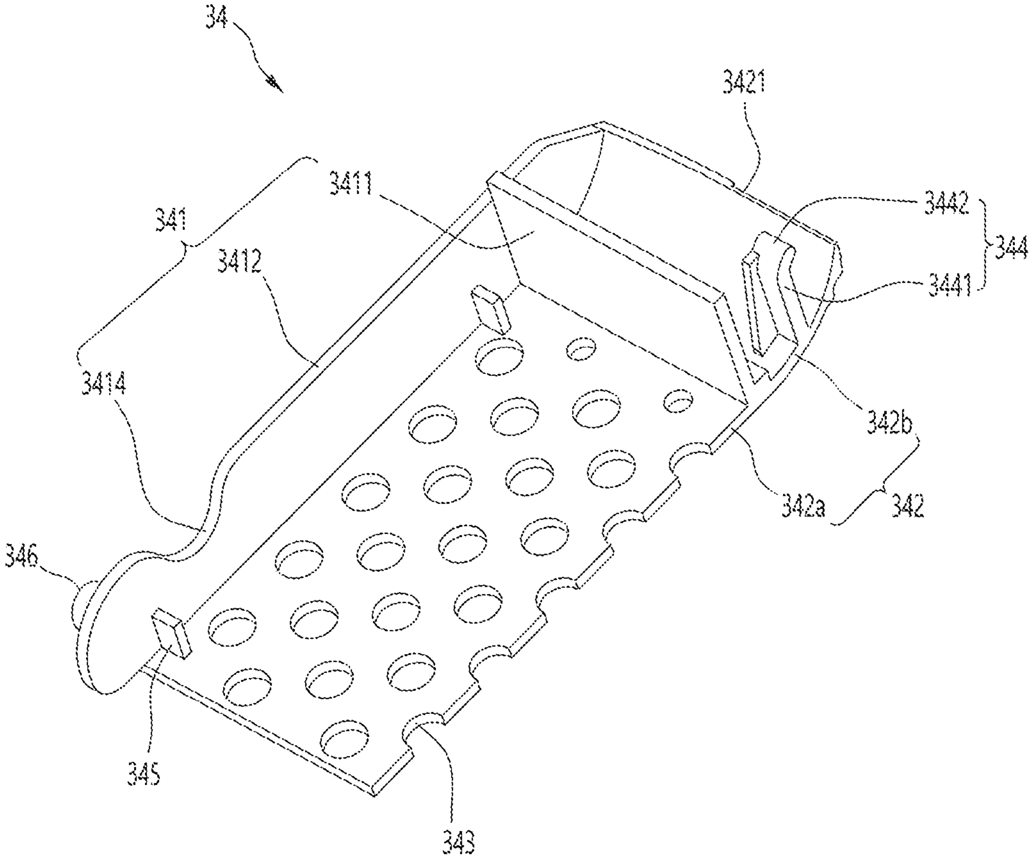
FIG. 17 is a cutaway perspective view illustrating an example of a filter housing.
Figure 18:
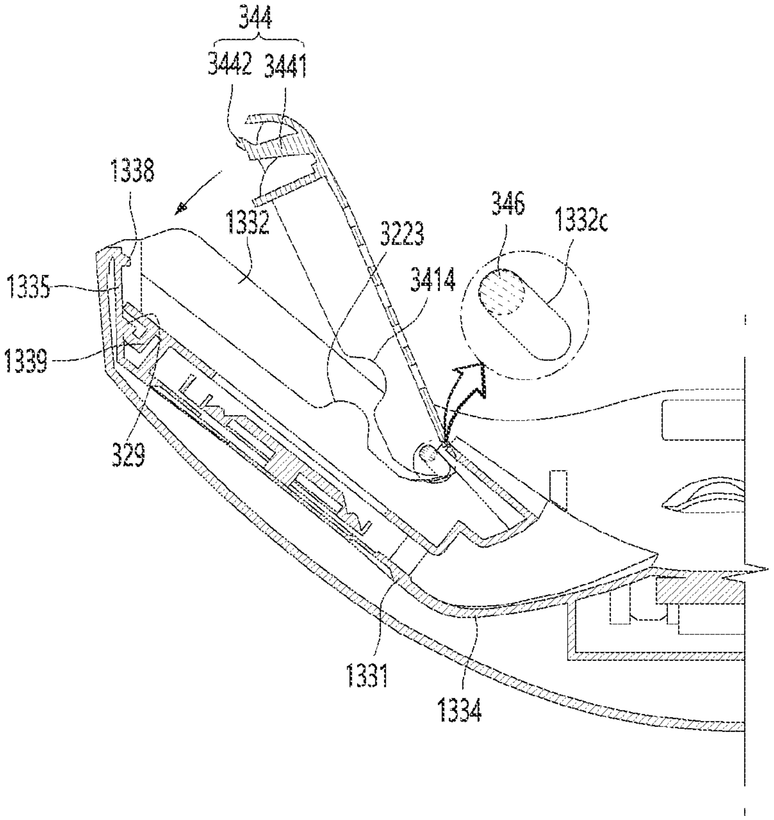
FIGS. 18 to 22 are cross-sectional views sequentially illustrating examples of a closing process of a filter housing.
Figure 19:
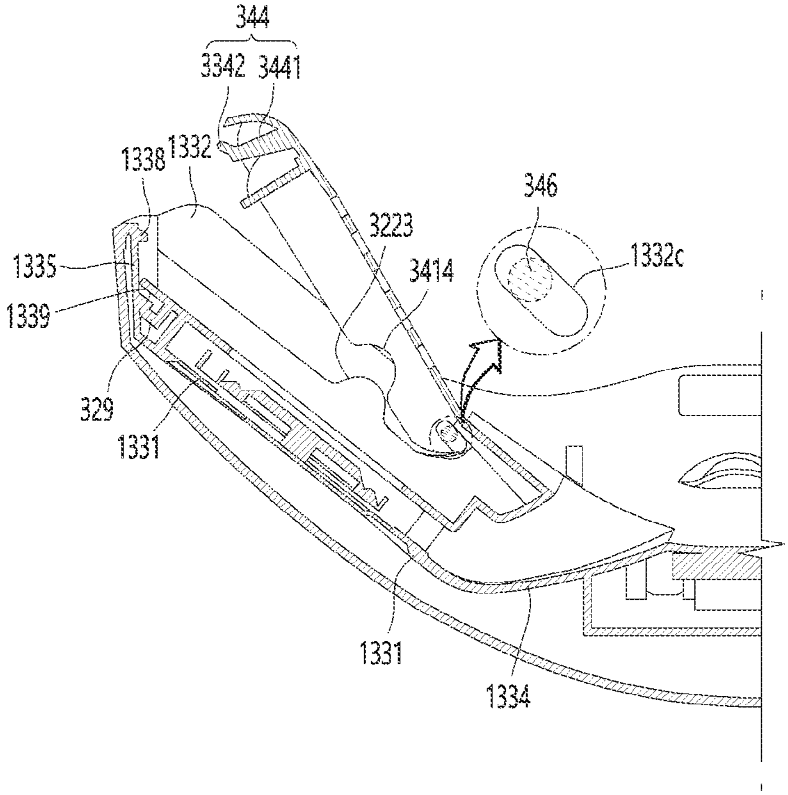
Figure 20:
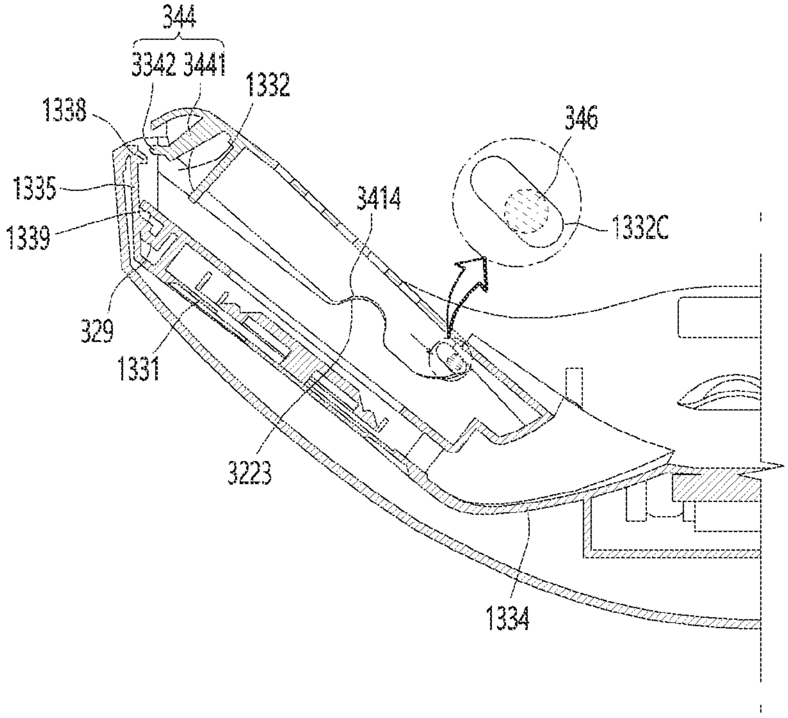
Figure 21:
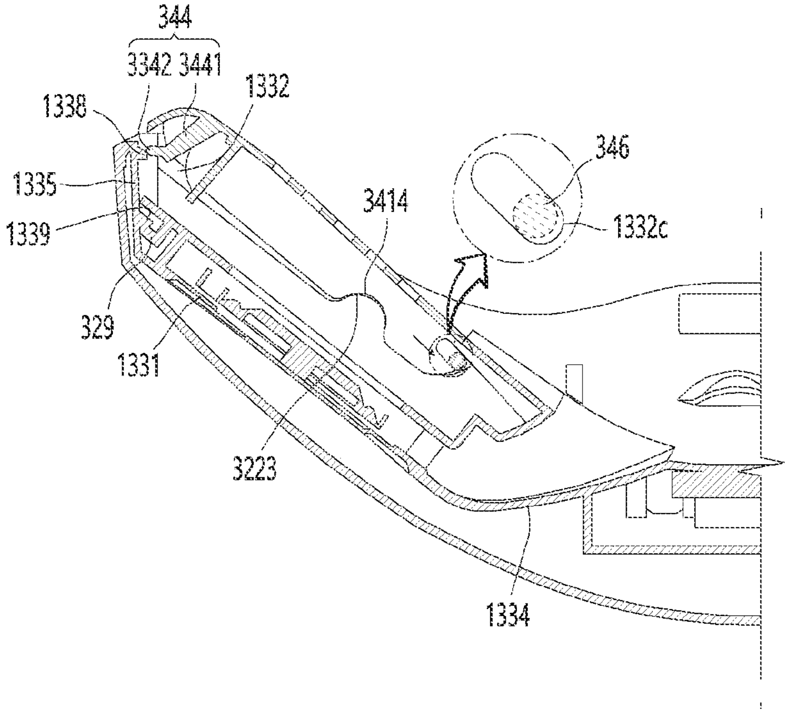

FIG. 17 is a cutaway perspective view of a filter housing according to an implementation of the present disclosure.

Referring to FIG. 17, the front surface of the filter housing 34 according to the implementation of the present disclosure can face the rear surface of the filter 33 seated on the rear surface of the flow guide 32, and the rear surface of the filter housing 34 can define a portion of the rear surface of the mask body 11. In some cases, when the user wears the mask apparatus 10, the rear surface of the filter housing 34 can face the user's face.

In some cases, the filter housing 34 can include a filter frame 341 surrounding three sides of the filter 33, and a filter cover 342 provided at a rear surface of the filter frame 341.

The filter cover 342 can include a cover body 342*a* on which the suction port 343 is provided and in which the filter frame 341 extends on the front surface, and an extension portion 342*b* extending from one side end portion of the cover body 342*a*.

In some cases, the extension portion 342*b* can be formed to be smoothly rounded to fit the contour of the rear surface of the mask body 11. The gripping groove 3421 can be defined at an end portion of the extension portion 342*b*. When the filter cover 342 is closed, the gripping groove 3421 can be in contact with the gripping groove 1337 (see FIG. 14) provided at the side end portion of the rear body 13.

Figure 22:
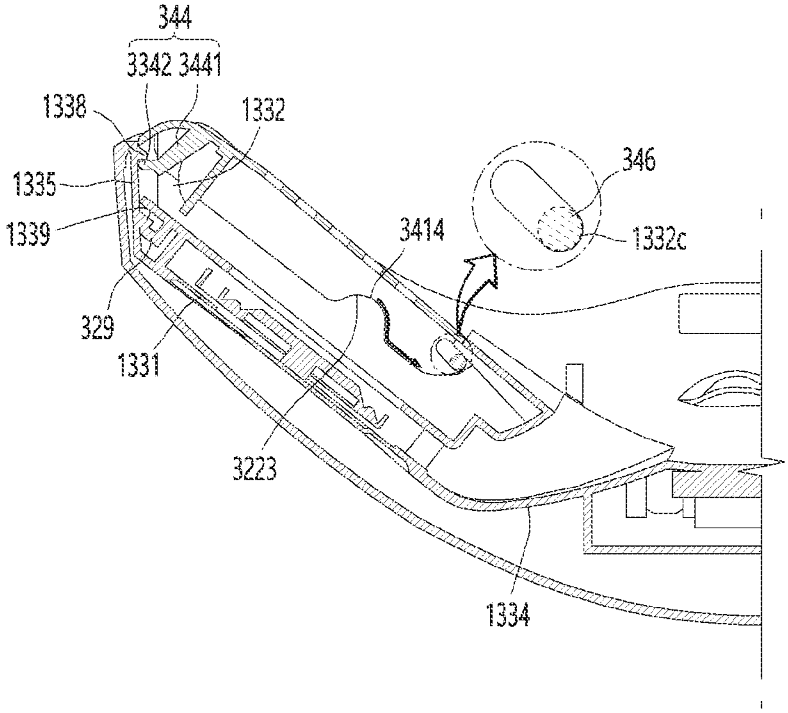

In addition, a fastening hook 344 can protrude from the center of the front surface of the extension portion 342*b*. When the filter cover 342 is closed, the fastening hook 344 can be caught by the filter hook 1338 so that the filter cover 342 is fixedly coupled to the rear body 13 (see FIG. 22).

In some implementations, when the filter cover 342 is closed, the rear surface of the filter cover 342 can define a portion of the rear surface of the rear body 13 or a portion of the rear surface of the mask body 11. In one example, a portion of the rear body 13 excluding the opening defining the rear surface of the accommodation portion 133 and the filter cover 342 complete the rear surface of the mask body 11.

In some cases, hinges 346 can protrude from both sides of the inner end portion of the filter housing 34, that is, the opposite end portion of the extension portion 342*b*. The hinge 346 can be inserted into the hinge hole 1332*c* having the shape of a long hole, the hinge configured to move between one end and the other end of the hinge hole 1332*c* during the opening and closing process of the filter housing 34.

In some cases, the filter frame 341 can include a side frame 3411 extending forward from the front surface of one side end portion of the cover body 342*a*, and an upper frame 3412 extending forward from the front surface of the upper end portion of the cover body 342*a*, and a lower frame provided opposite to the upper frame 3412. In some cases, only three sides of the filter 33 are surrounded by the filter frame 341.

Guide grooves 3414 can be defined in the upper frame 3412 and the lower frame, and configured to accommodate guide shoulders 3223 and 3233 of the flow guide 32. When the filter housing 34 is closed after the filter is inserted, the fastening hook 344 of the filter housing 34 can be caught on filter hook 1338 by the engagement process of the guide groove 3414 and the guide shoulders 3223 and 3233. In addition, the side frame 3411 can be defined as an interface dividing the filter cover 342 into the cover body 342*a* and the extension portion 342*b*.

FIGS. 18 to 22 are cross-sectional views sequentially illustrating a closing process of a filter housing according to an implementation of the present disclosure.

Referring to FIGS. 18 to 22, the hinge 346 of the filter housing 34 can be inserted into the hinge hole 1332*c* in the form of a long hole extending obliquely.

In some cases, the user can grab the end of the extension portion 342*b* and lift it up so that the fastening hook 344 of the filter housing 34 is separated from the filter hook 1338. When the fastening hook 344 is separated from the filter hook 1338, the user can grab the end of the extension portion 342*b* and lift the end of the extension portion 342*b* up while pulling the end of the extension portion 342*b* toward the side end portion of the mask body 11. In some cases, as the hinge 346 moves from one end portion of the hinge hole 1332*c* toward the other end portion thereof, the opening angle of the filter housing 34 can increase. In one example, the filter housing 34 can be opened without interfering with the rear flange 325 of the flow guide 32.

FIG. 18 is a cross-sectional view illustrating a state where the filter housing 34 is maximally opened, wherein the hinge 346 is positioned at the other end of the hinge hole 1332*c*.

In some implementations, if the filter housing 34 is pushed in until the hinge 346 is in contact with one end of the hinge hole 1332*c* and is not closed, the hook may not engage while the catching portion 3442 of the fastening hook 344 slides along the outer surface of the hook 1338. Furthermore, when the user closes the filter housing 34 with excessive force, he fastening hook 344 may break.

In some implementations, even when the user closes the filter housing 34 where the user does not push the hinge 346 in until the hinge touches one end of the hinge hole 1332*c*, the fastening hook 344 can be coupled to the filter hook 1338.

In one example, guide shoulders 3223 and 3233 can protrude from the flow guide 32 in a round manner, and a guide groove 3414 can be provided at a side of the filter housing 34. In addition, when the filter housing 34 is closed, while the guide groove 3414 slides along the rounded surfaces of the guide shoulders 3223 and 3233, the guide shoulders 3223 and 3233 can be coupled to the guide groove 3414, and thus the catching portion 3442 of the fastening hook 344 can be caught on the inner surface of the filter hook 1338.

As illustrated in FIGS. 18 to 22, as the opening angle of the filter housing 34 gradually decreases, the guide groove 3414 can move to a position where the guide groove 3414 is coupled to the guide shoulders 3223 and 3233. In some cases, the hinge 346 can move from the other end to one end of the hinge hole 1332*c*.

Figure 23:
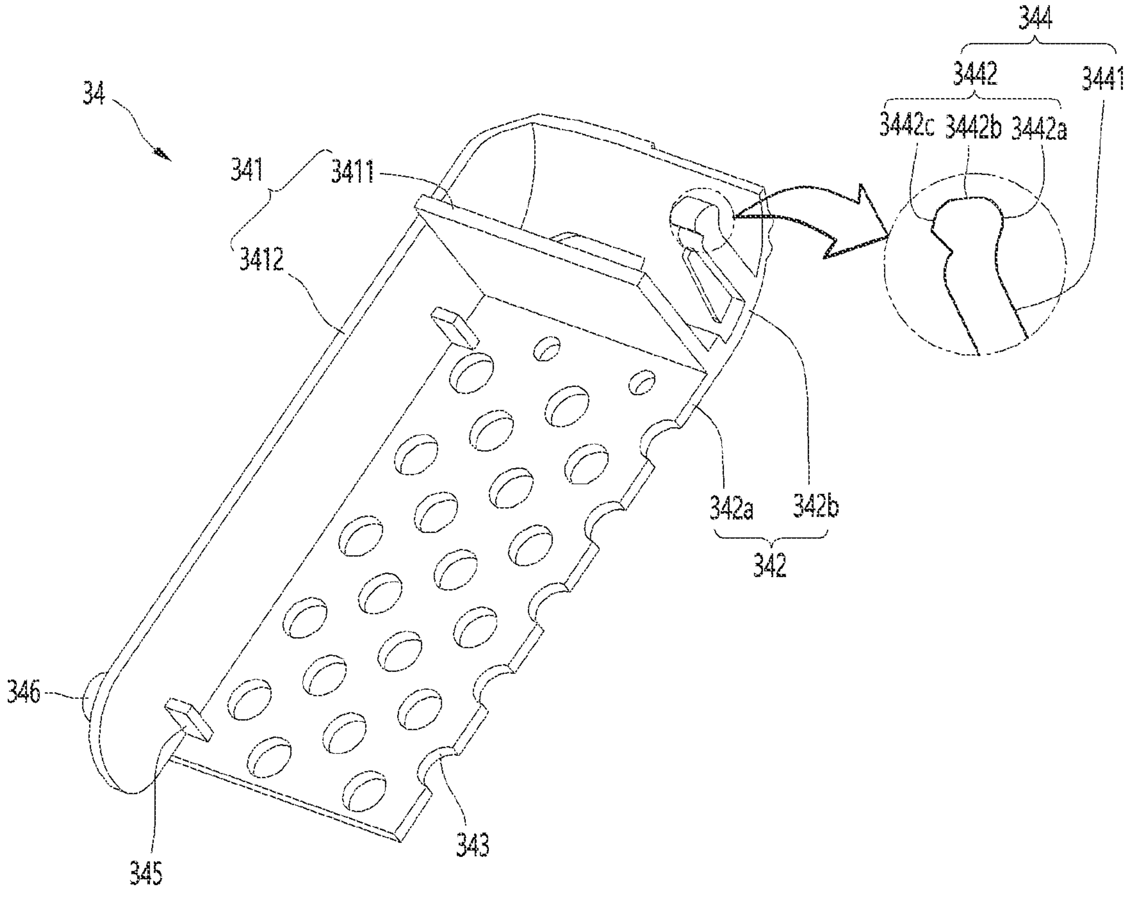
FIG. 23 is a cutaway perspective view illustrating an example of a filter housing.

FIG. 23 is a cutaway perspective view of a filter housing according to another implementation of the present disclosure.

Referring to FIG. 23, guide grooves are not separately defined in the upper frame 3412 and the lower frame 3413 of the filter housing 34 according to another implementation of the present disclosure, and a guide shoulder is also not defined in the flow guide 32.

However, in some implementations, the shape of the end portion of the fastening hook 344 can be improved, so that when the filter housing 34 is closed, the fastening hook 344 and the filter hook 3818 can be fastened.

In some cases, the fastening hook 344 can include an extension portion 3441 extending from the filter cover 342 and a catching portion 3442 provided at an end portion of the extension portion 3441.

The catching portion 3442 can include a catching surface 3442*a* inclined toward the outer edge of the filter housing 34, a sliding surface 3442*b* extending in a straight line form from an end portion of the catching surface 3442*a*, and a contact surface 3442*c* that is rounded with a predetermined curvature at the end portion of the sliding surface 3442*b*.

The contact surface 3442*c* can be a surface that is first in contact with the filter hook 1338 when the filter housing 34 is closed.

FIGS. 24 to 28 are cross-sectional views sequentially illustrating a closing process of a filter housing according to another implementation of the present disclosure.

Referring to FIGS. 24 to 28, when the filter housing 34 is opened, the hinge 346 can be in a state of being caught at the other end of the hinge hole 1332*c*.

Figure 24:
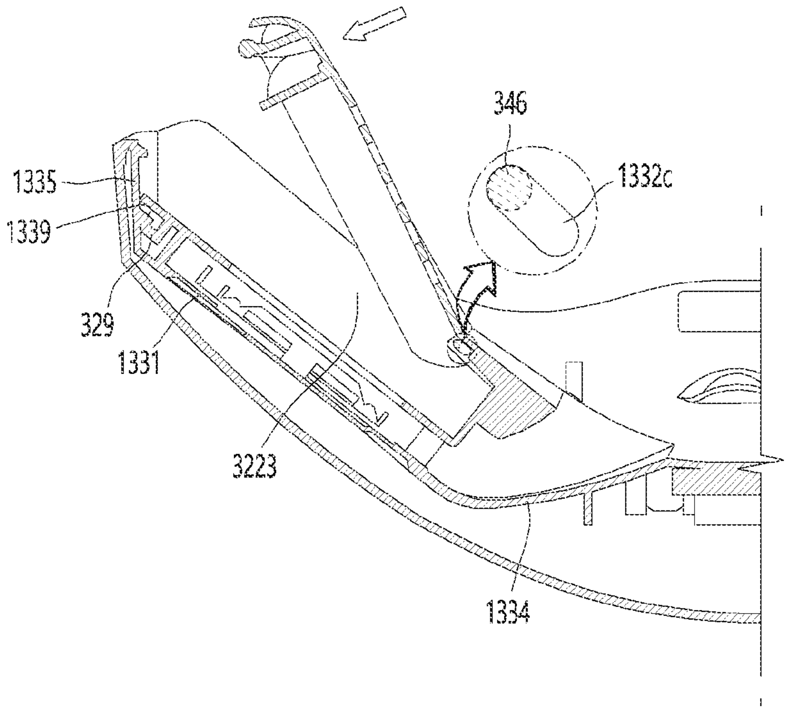
FIGS. 24 to 28 are cross-sectional views sequentially illustrating examples of a closing process of a filter housing.
Figure 25:
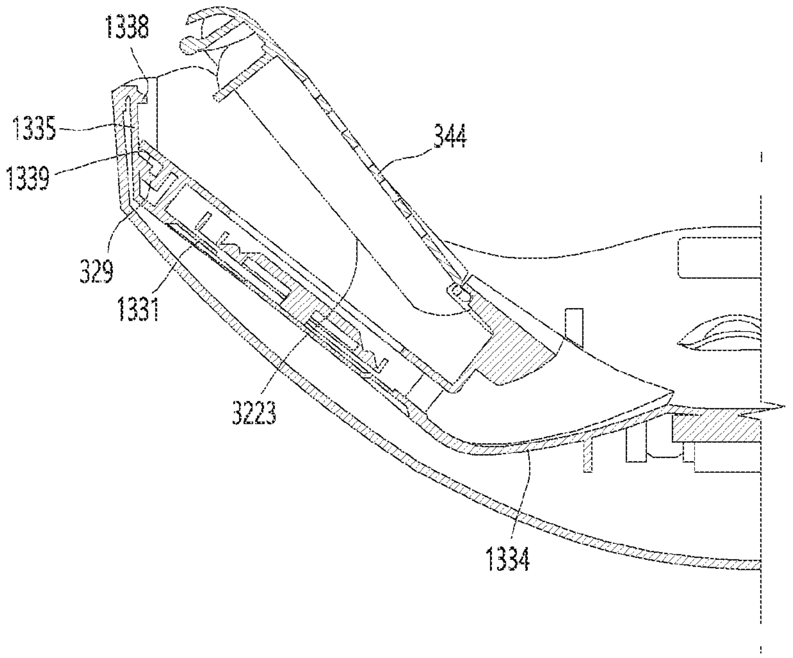
Figure 26:
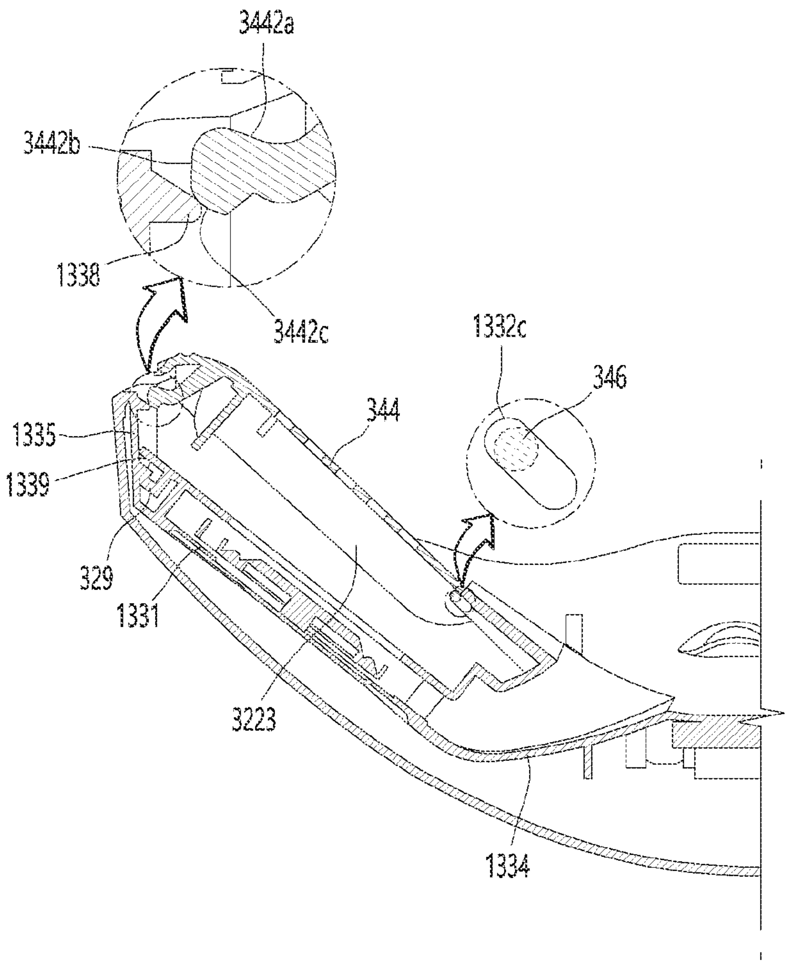
Figure 27:
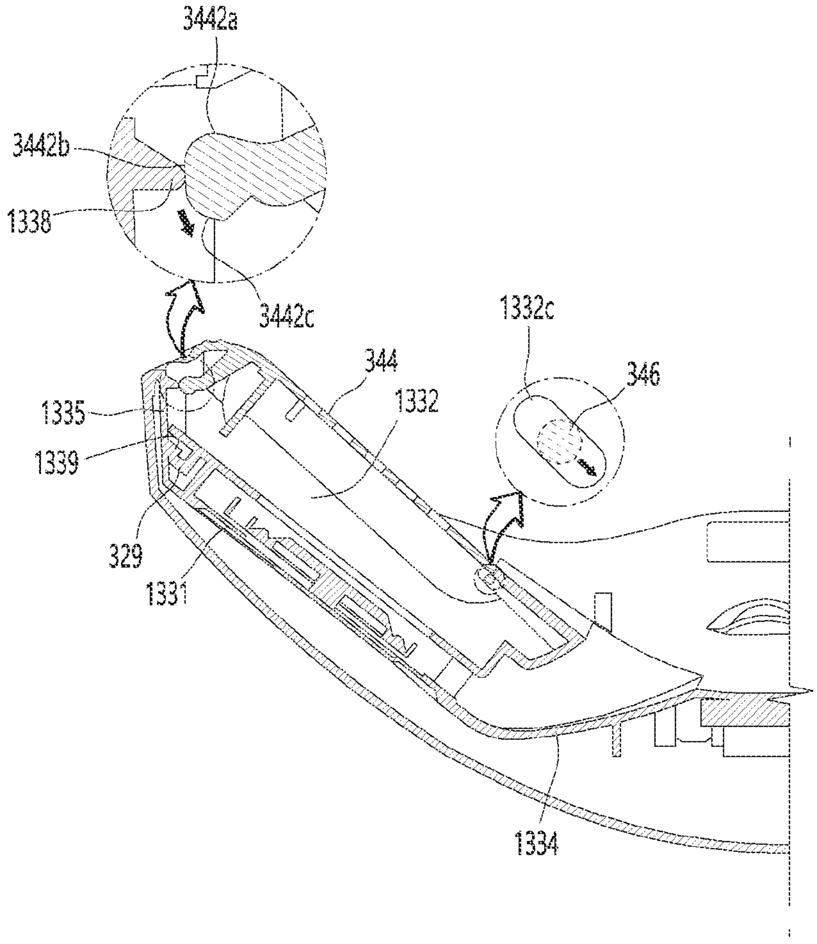
Figure 28:
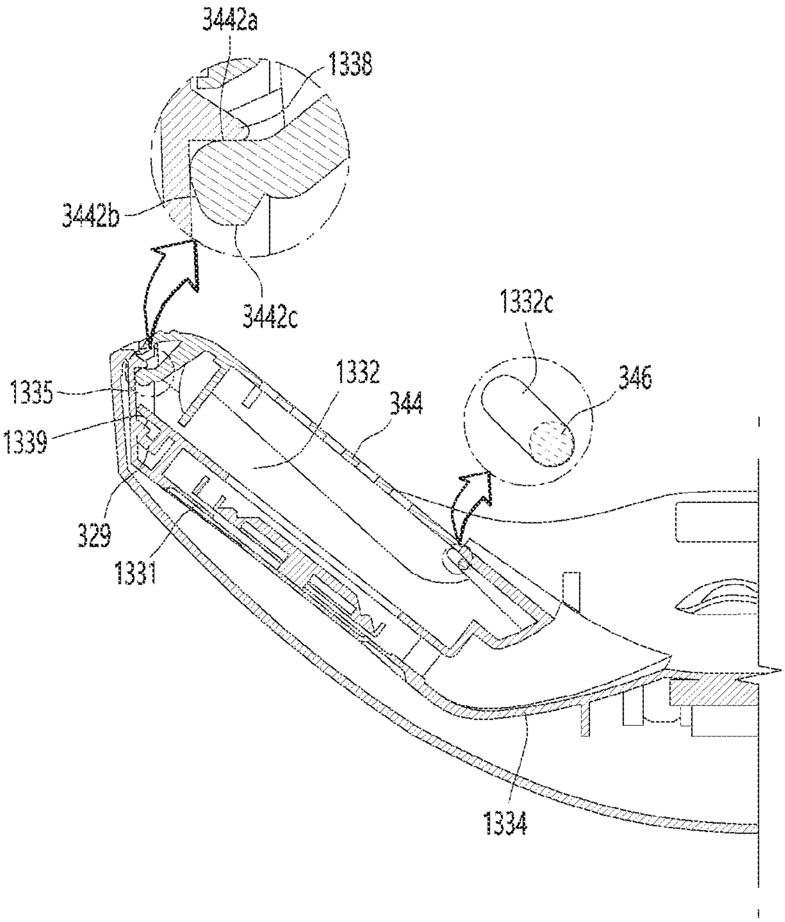

In some cases, when the user rotates without pushing the end portion of the filter housing 34 at the side of the hinge 346, that is, when the filter housing 34 is pushed in the direction of the arrow in FIG. 24 and closed, as illustrated in FIG. 26, the tip of the filter hook 1338 can be in contact with the contact surface 3442*c*.

In some cases, when the rear surface of the filter housing 34 is further pressed while the tip of the filter hook 1338 is in contact with the contact surface 3442*c*, the tip of the filter hook 1338 can reach the sliding surface 3442*b* while moving along the contact surface 3442*c*. In some cases, when the tip of the filter hook 1338 moves along the contact surface 3442*c* and the sliding surface 3442*b*, the hinge 346 can move toward one end of the hinge hole 1332*c*.

In some cases, when the rear surface of the filter housing 34 is completely closed, the inner surface of the filter hook 1338 can be in contact with the catching surface 3442*a* with a "click" sound, and the catching portion 3442 can be caught on the filter hook 1338.

In some examples, when the user closes the filter housing 34, the shape of the catching portion 3442 of the fastening hook 344 can prevent the fastening hook 344 from being damaged while the end portion of the fastening hook 344 can slide along the outer surface of the filter hook 1338.

What is claimed is:

1. A mask apparatus comprising:
- a mask body having a suction port at a rear surface thereof, the mask body including:
  - a front body, and
  - a rear body coupled to a rear surface of the front body, the rear body including:
    - a pair of accommodation portions that protrude from a front surface of the rear body toward the front body and are covered by the front body, each of the pair of accommodation portion defining a recess,
    - an exhaust port provided under the pair of accommodation portions, and
    - an exhaust flow path guide protruding forward along an edge of the exhaust port;
- a face guard that is coupled to a rear surface of the rear body, the face guard being configured to contact a user's face and defining a breathing space formed therein;
- a fan module received in one of the pair of recesses of the pair of accommodation portions and configured to supply external air to the breathing space through the suction port;
- a pair of strap connectors provided at an upper portion and a lower portion of an end portion of the rear body, respectively; and
- a sealing cover coupled to an end portion of the exhaust flow path guide.

2. The mask apparatus of claim 1, wherein the sealing cover includes:
- a cover frame provided at a front surface of the exhaust flow path guide;
- an inner rib extending rearward from an inner edge of the cover frame; and
- an outer rib extending rearward from an outer edge of the cover frame, and wherein a fitting groove is defined between the inner rib and the outer rib and configured to accommodate the exhaust flow path guide.

3. The mask apparatus of claim 2, wherein the sealing cover further includes a connection rib that couples a left portion and a right portion of the cover frame.

4. The mask apparatus of claim 1, wherein the sealing cover is made of a rubber or silicone material.

5. The mask apparatus of claim 1, wherein the sealing cover extends to an edge of a lower end portion of the rear body.

6. The mask apparatus of claim 1, wherein the pair of accommodation portions are symmetrically disposed with respect to a vertical plane passing through a center of the rear body in a left and right direction.

7. The mask apparatus of claim 1, further comprising:

a flow guide provided behind the fan module;

a filter seated on the flow guide and configured to purify the external air that flows into the fan module; and a filter housing including:

a filter frame that covers a side surface of the filter, and a filter cover that covers a rear surface of the filter, wherein the rear surface of the filter cover defines a portion of the rear surface of the mask body.

8. The mask apparatus of claim 7, wherein the suction port is defined at the filter cover to suction the external air through the rear surface of the mask body.

9. The mask apparatus of claim 8, wherein a discharge port is defined between an inner edge of one of the pair of accommodation portions and an inner edge of the flow guide.

10. The mask apparatus of claim 8, wherein the suction port includes a plurality of holes having different diameters.

11. The mask apparatus of claim 1, wherein a strap connector of the pair of strap connectors includes:

a strap groove that is recessed from the front surface of the rear body and extends in a horizontal direction;

a strap hole;

a strap bar that couples an upper surface and a lower surface of the strap groove; and a tubular waterproof sleeve that is provided at the front surface of the rear body.

12. The mask apparatus of claim 1, wherein the pair of strap connectors is one of a plurality of strap connectors comprising (i) a first pair of strap connectors provided at a left side portion of the rear body, and (ii) a second pair of strap connectors provided at a right side portion of the rear body.

13. The mask apparatus of claim 11, wherein the tubular waterproof sleeve extends forward from the front surface of the rear body along an edge of the strap hole by a predetermined length.

14. The mask apparatus of claim 11, wherein the tubular waterproof sleeve is configured to accommodate a sealing cap, the sealing cap configured to limit moisture and foreign substances into a space defined between the front body and the rear body.

* * * * *